(12) United States Patent
Vohra et al.

(10) Patent No.: US 11,441,948 B2
(45) Date of Patent: Sep. 13, 2022

(54) MULTI-DISPERSIVE SPECTROMETER

(71) Applicant: MKS TECHNOLOGY, INC., Laramie, WY (US)

(72) Inventors: Quaid Vohra, Laramie, WY (US);
Celestin Zemtsop, Laramie, WY (US);
Mark Watson, Laramie, WY (US)

( * ) Notice: Subject to any disclaimer, the term of this patent is extended or adjusted under 35 U.S.C. 154(b) by 0 days.

(21) Appl. No.: 17/054,157

(22) PCT Filed: Mar. 25, 2020

(86) PCT No.: PCT/US2020/024788
§ 371 (c)(1),
(2) Date: Nov. 9, 2020

(87) PCT Pub. No.: WO2020/198402
PCT Pub. Date: Oct. 1, 2020

(65) Prior Publication Data
US 2021/0231499 A1    Jul. 29, 2021

Related U.S. Application Data

(60) Provisional application No. 62/823,089, filed on Mar. 25, 2019.

(51) Int. Cl.
| | | |
|---|---|---|
| *G01J 3/44* | (2006.01) |
| *G01J 3/02* | (2006.01) |
| *G01J 3/10* | (2006.01) |
| *G01J 3/18* | (2006.01) |
| *G01J 3/28* | (2006.01) |

(52) U.S. Cl.
CPC ............... *G01J 3/44* (2013.01); *G01J 3/0208* (2013.01); *G01J 3/0297* (2013.01); *G01J 3/10* (2013.01); *G01J 3/18* (2013.01); *G01J 3/2803* (2013.01)

(58) Field of Classification Search
None
See application file for complete search history.

(56) References Cited

U.S. PATENT DOCUMENTS 5,513,913 A * 5/1996 Ball ................... G01D 5/35383
250/227.14
5,784,158 A * 7/1998 Stanco ....................... G01J 3/02
356/326

(Continued)

*Primary Examiner* — Shawn Decenzo
(74) *Attorney, Agent, or Firm* — FisherBroyles, LLP; Thomas J. Osborne, Jr.

(57) ABSTRACT

A multi-dispersive spectrometer is provided in which the spectrometer comprises an optical system configured to direct an excitation signal from an excitation light source toward a sample, receive a spectroscopy signal from the sample, and direct the spectroscopy signal toward the detector. The optical system comprises a movable optical component adapted to move the spectroscopy signal relative to at least one sensor of the detector and the detector is adapted to detect a plurality of discrete shifted spectroscopy signals. A method of obtaining a Raman spectrum from a sample is also provided. The method comprises directing an excitation signal from an excitation light source toward a sample; receiving a spectroscopy signal from the sample; and directing the spectroscopy signal toward a detector, wherein the spectroscopy signal is moved relative to at least one sensor of the detector to provide a plurality of discrete shifted spectroscopy signals.

24 Claims, 17 Drawing Sheets

(56) References Cited

U.S. PATENT DOCUMENTS

| | | | | |
|---|---|---|---|---|
| 6,381,008 B1* | 4/2002 | Branagh | ................... | G01J 3/18 |
| | | | | 356/328 |
| 7,330,267 B1* | 2/2008 | Weitzel | ................... | G01J 3/453 |
| | | | | 356/456 |
| 8,049,886 B1* | 11/2011 | Raksi | ................. | G01B 9/02044 |
| | | | | 356/326 |
| 8,570,507 B1* | 10/2013 | Cooper | .................... | G01J 3/10 |
| | | | | 356/301 |
| 9,784,618 B2* | 10/2017 | Zhu | .................... | G02B 26/0808 |
| 9,784,619 B2* | 10/2017 | Zhu | ....................... | G01J 3/0237 |
| 2002/0122246 A1* | 9/2002 | Tearney | ................ | G01J 3/0291 |
| | | | | 359/368 |
| 2003/0026475 A1* | 2/2003 | Yahashi | ............. | G01B 11/2509 |
| | | | | 382/154 |
| 2005/0018189 A1* | 1/2005 | Hampton | ................ | G01J 3/447 |
| | | | | 356/369 |
| 2007/0103679 A1* | 5/2007 | Yoo | ........................... | G01J 3/02 |
| | | | | 356/301 |
| 2007/0279629 A1* | 12/2007 | Grun | ........................ | G01J 3/44 |
| | | | | 356/318 |
| 2008/0204711 A1* | 8/2008 | Harrison | ............... | G01J 3/0208 |
| | | | | 356/51 |
| 2009/0213371 A1* | 8/2009 | Goodyer | ............... | G01J 3/0202 |
| | | | | 356/319 |
| 2012/0236382 A1* | 9/2012 | Puegner | ................ | G01J 3/0208 |
| | | | | 359/209.1 |
| 2015/0241276 A1* | 8/2015 | Shiraiwa | ............... | G01J 3/0264 |
| | | | | 250/206 |
| 2017/0184453 A1* | 6/2017 | Wang | ........................ | G01J 3/36 |

* cited by examiner

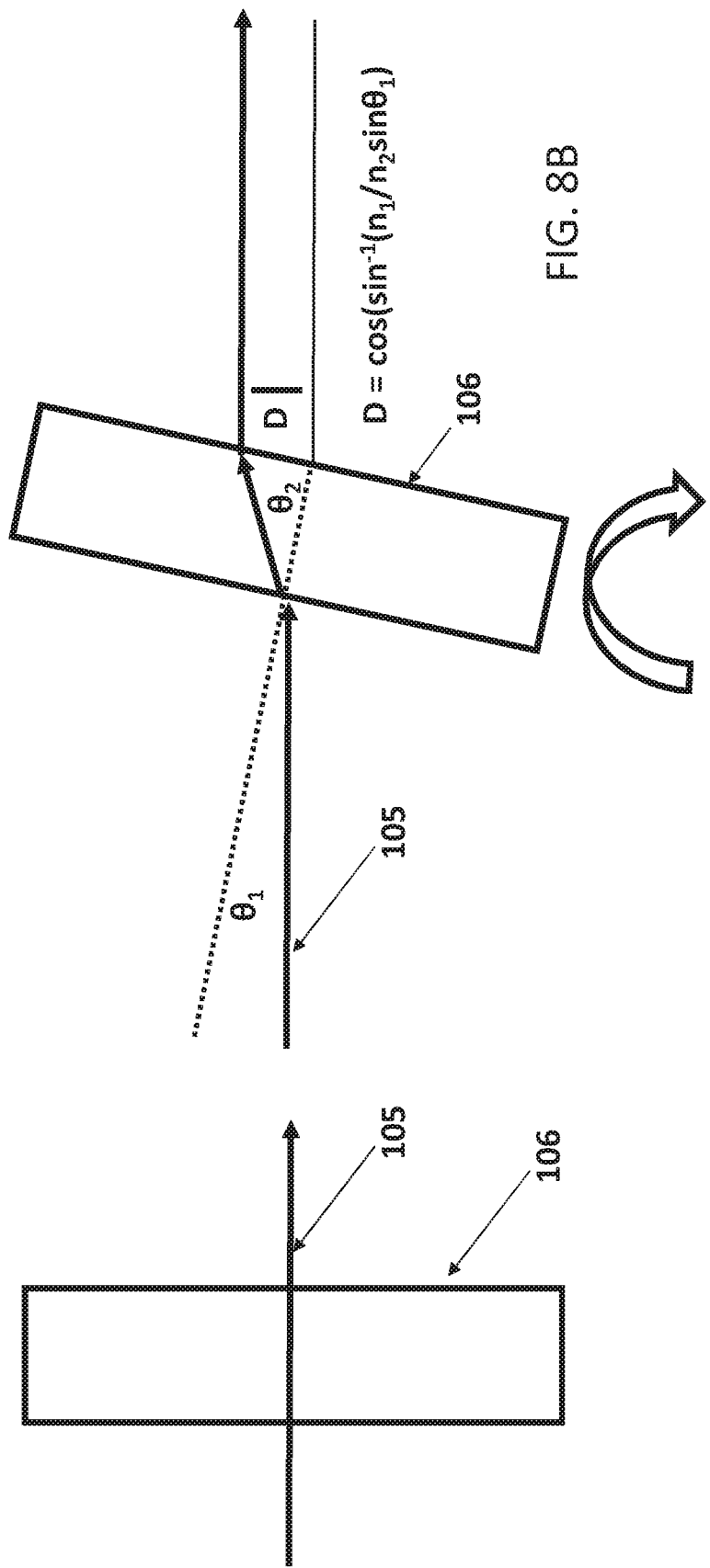

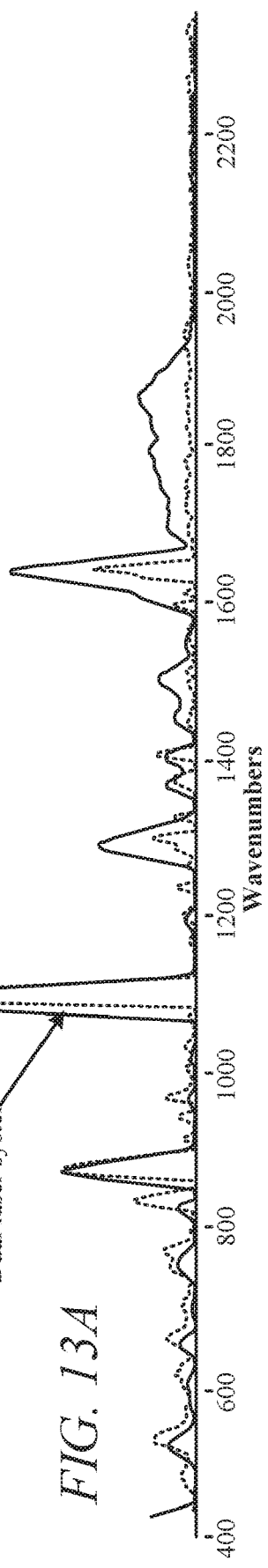
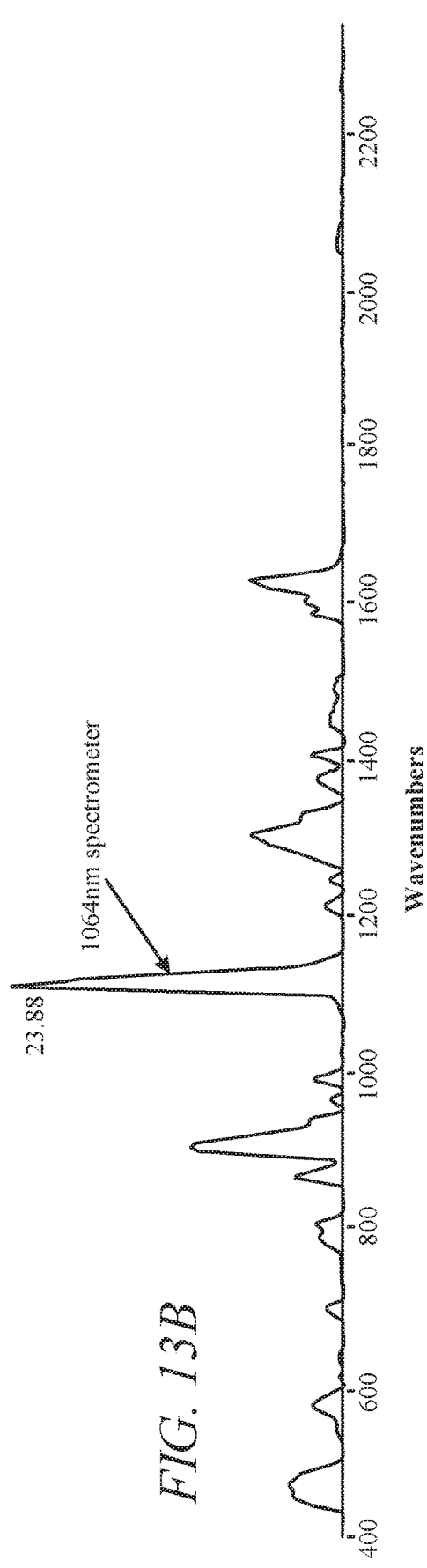
FIG. 13A
FIG. 13B

MULTI-DISPERSIVE SPECTROMETER

CROSS-REFERENCE TO RELATED APPLICATIONS

This application claims the benefit of U.S. provisional application No. 62/823,089, filed 25 Mar. 2019, which is hereby incorporated by reference as though fully set forth herein.

BACKGROUND

Field

Embodiments of the present disclosure relate generally to spectroscopy and to laser sources useful for spectroscopy, such as Raman spectroscopy.

Background

Spectroscopy is a general term for the process of measuring energy or intensity as a function of wavelength in a beam of electromagnetic radiation (e.g., light). Many conventional spectrometers include basic features and components such as a slit and a collimator for producing a parallel beam of radiation, one or more prisms or gratings for dispersing radiation through differing angles of deviation based on wavelength, and apparatus for collecting and measuring characteristics of dispersed radiation. Spectroscopy uses absorption, emission, or scattering of electromagnetic radiation by molecules or ions to qualitatively and quantitatively study physical properties and processes of matter.

Light or radiation directed at a target, or sample of physical matter, during operation of a spectrometer system may be referred to as incident radiation. Redirection of incident radiation following contact with a sample commonly is referred to as scattering of radiation. To the extent that atoms or molecules in a sample absorb all or a portion of incident radiation, rather than reflect incident radiation, a sample may become excited, and the energy level of the sample may be increased to a higher energy level. Electromagnetic radiation that passes through a sample may produce a small portion of light that is scattered in a variety of directions. Light that is scattered but continues to have the same wavelength as the incident radiation will also have the same energy, a condition often referred to as Rayleigh or elastically scattered light. Incident radiation that is scattered during a change of vibrational state in molecules may be scattered with a different energy, and such scattered light may be called Raman scattered light. Such phenomena have been used in conjunction with spectroscopy to qualitatively and quantitatively study physical properties and processes, including identification of chemical properties, compositions, and structures of a sample.

A wave of electromagnetic radiation may be characterized by wavelength (the physical length of one complete oscillation) and by frequency of the wave (the number of oscillations per second that pass a given point). The wavelength of incident radiation on a sample may remain substantially unchanged in scattered radiation. Alternatively, the wavelength in scattered radiation may shift to one or more different wavelengths relative to the incident wavelength. The wavelength differential between the incident radiation and the scattered radiation may be referred to as a Raman shift. Spectroscopic measurement of Raman scattered light is a measure of the resulting wavelength of such scattered light.

Raman scattering may occur at wavelengths shifted from the incident light by quanta of molecular vibrations. The phenomenon of Raman scattered light, therefore, is useful in spectroscopy applications for studying qualities and quantities of physical properties and processes, including identification of chemical properties, compositions, and structures in a sample. Measurement of scattered radiation may enable identification of one or more frequencies associated with the sample, as well as the intensities of those shifted frequencies. The frequencies may be used to identify the chemical composition of a sample. If, for example, intensities are plotted on a Y-axis, and frequency or frequencies are plotted on an X-axis, the frequency or frequencies may be expressed as a wavenumber (the reciprocal of the wavelength expressed in centimeters). The X-axis, showing the frequency or frequencies, may be converted to a Raman shift in wavenumbers (a measure of the difference between the observed wavenumber position of spectral bands) and the wavenumber of radiation appearing in the incident radiation.

Raman scattering offers a significant opportunity for qualitative and quantitative studies of physical properties and processes, including identification of chemical compositions and structure in samples of physical matter. However, Raman scattering is a comparatively weak effect when compared with Rayleigh or elastic scattering. Only about one scattered photon in about $10^6$ to about $10^8$ photons tends to be Raman shifted.

Detection limits in Raman spectroscopy are decreased by ambient light and background interference during sampling. Ambient light usually takes the form of interior lighting or sunlight, which can overpower even the strongest scattering samples. Thus, detectors and samples being scanned are typically fully enclosed to shield from ambient light. Samples that cannot be fully enclosed present special challenges.

Excitation sources used in Raman spectroscopy include gas lasers such as helium-neon, helium-cadmium, argon-ion, krypton-ion, as well as solid-state lasers including Nd-YAG, and diode lasers, solid-state tunable lasers, liquid dye lasers, fiber lasers, and other lasers.

Background interference also comes from non-spontaneous emissions from some types of samples, such as fluorescence. Fluorescence occurs when absorbed radiation is reduced in frequency by internal molecular processes and emitted as radiation that is closer to the red end of the visible light spectrum. Fluorescence sometimes may be strong enough in comparison with the Raman shift to swamp, or substantially overwhelm, the weaker Raman signal. Fluorescence decreases the dynamic range and ultimately the signal-to-noise ratio of data obtained from a sample.

Fluorescence can be reduced by exciting at higher wavelengths, such as 1064 nm, but at the cost of expensive components and a loss of signal-to-noise ratios for all samples (i.e., even those samples not plagued by the problem of fluorescence). The loss of signal-to-noise is due to poor detectors at this wavelength and because Raman scattering varies with the wavelength to the negative fourth power ($\lambda^{-4}$).

Fluorescence can also be reduced by exciting a sample with a plurality of different wavelengths, obtaining a Raman signal from the sample for each of the plurality of different wavelengths, and decomposing a Raman spectrum from the plurality of Raman signals to obtain a decomposed Raman signal that reduces or eliminates noise, such as fluorescence and background radiation. The plurality of different wavelengths has been provided by using a plurality of laser light sources operating at the respective plurality of different wavelengths or by using a tunable laser to provide different wavelengths corresponding to different temperatures.

BRIEF SUMMARY

In various embodiments, a multi-dispersive spectrometer is provided. The spectrometer comprises an optical system configured to direct an excitation signal from an excitation light source toward a sample, receive a spectroscopy signal from the sample, and direct the spectroscopy signal toward the detector. The optical system comprises a movable optical component adapted to move the spectroscopy signal relative to at least one sensor of the detector and the detector is adapted to detect a plurality of discrete shifted spectroscopy signals.

The moveable optical component may, for example, comprise at least one of a dispersion element, a diffractive grating, the detector, a filter, an optical flat, a micro-electromechanical system (MEMS) element, and a mirror. The movable element may move by rotating and/or translating within the optical system of the spectrometer in various embodiments. The movement may be relative to a detector of the optical system, relative to an optical path of the optical system or relative to one or more other components of the spectrometer optical system.

A piezoelectric mount is also provided for rotating a movable element within the optical system of the spectrometer.

In some embodiments, a mathematical decomposed spectroscopy signal is derived from the plurality of detected discrete shifted spectroscopy signals. The mathematical decomposed spectroscopy signal can be utilized to reduce noise, such as fluorescence and or background radiation. The noise can be reduced without the use of multiple lasers or a tunable laser adapted to change an excitation signal wavelength for a plurality of the discrete shifted spectroscopy signals. The noise can also be reduced without changing a frequency of the excitation signal. The excitation light source, for example, may comprise a single laser operating a generally consistent operating frequency.

The movable optical component may be adapted to move the spectroscopy signal relative to an optical path of the optical system in a plurality of steps to provide the plurality of discrete shifted spectroscopy signals and/or adapted to shift the dispersed spectroscopic signal across a plurality of sensors of the detector in the plurality of steps.

In other variations, a method of obtaining a Raman spectrum from a sample is also provided. The method comprises directing an excitation signal from an excitation light source toward a sample; receiving a spectroscopy signal from the sample; and directing the spectroscopy signal toward a detector, wherein the spectroscopy signal is moved relative to at least one sensor of the detector to provide a plurality of discrete shifted spectroscopy signals.

In various embodiments, the method comprises moving the spectroscopy signal relative to the at least one sensor of the detector via a movable component of the optical system.

The movable component of the optical system may comprise any component adapted to move a spectroscopy signal relative to the detector, relative to an optical path of the spectrometer, and/or relative to one or more other components of the spectrometer optical system. For example, the movable component may comprise at least one of a dispersion element, a diffractive grating, the detector, a filter, an optical flat, a micro-electromechanical system (MEMS) element, and a mirror.

In some embodiments, the method may derive a mathematical decomposed spectroscopy signal from the plurality of detected discrete shifted spectroscopy signals. The mathematical decomposed spectroscopy signal can be utilized to reduce noise, such as fluorescence and or background radiation. The noise can be reduced without the use of multiple lasers or a tunable laser adapted to change an excitation signal wavelength for a plurality of the discrete shifted spectroscopy signals. The noise can also be reduced without changing a frequency of the excitation signal. The excitation light source, for example, may comprise a single laser operating a generally consistent operating frequency.

The method may also comprise superimposing data from each of the plurality of discrete shifted spectroscopy signals to create a vector, building a mathematical matrix operator, and using the mathematical matrix operator to solve a linear problem. The method may further use an iterative method to solve the linear problem that determines a Raman signal, that may include a baseline Raman signal. The method may further solve for an unknown vector of noise to at least substantially remove fluorescence and/or background noise.

Another method of determining a Raman spectroscopy signal is provided. The method comprises obtaining a plurality of discrete spectra corresponding to a plurality of discrete shifts within an optical system of a Raman spectrometer; superimposing data from each of the plurality of discrete shifted spectroscopy signals to create a vector; building a mathematical matrix operator; and using the mathematical matrix operator to solve a linear problem. The method may also use an iterative method to solve the linear problem that determines a Raman signal. The iterative method can also be used to solve for an unknown vector of noise, such as at least one of fluorescence and background radiation. The mathematical matrix operator may represent identity matrices of non-shifted noise spectral elements from the plurality of discrete shifted spectroscopy signals In various embodiments, a spectrometer comprises an optical system adapted to receive a spectroscopy signal and alter that signal by moving a component of the optical system to shift the spectroscopy signal relative to an optical sensor (e.g., a CCD array sensor). In one embodiment, for example, a movable grating, such as a rotating grating, is provided that can shift the spectroscopy signal relative to the optical sensor. In another embodiment, the optical sensor is adapted to move relative to the one or more components of the optical system to shift the received Raman signal relative to elements of the sensor. In other embodiments, both the grating and sensor may be moved relative to each other. In yet other embodiments, one or more other components of the optical system may be used to shift the spectroscopy signal relative to the optical sensor alone or in combination with one or both of a grating and a sensor.

In some embodiments, a plurality of excitation cycles may be obtained by a single laser operating at a generally consistent excitation frequency. One or more moveable components of the optical system of the spectrometer may be adapted to shift a received spectroscopy signal relative to an optical sensor of the spectrometer optical system. The plurality of individual sensed spectroscopy signals may be received in differing relative positions of the optical sensor to provide the plurality of individual sensed spectroscopy signals (e.g., by different corresponding locations or sensing elements of the optical sensor). A mathematical decomposed spectroscopy signal may be obtained based on the plurality of individual spectroscopy signals received. The decomposed spectroscopy signal may, for example, reduce or eliminate noise, such as fluorescence and background radiation, without the need for multiple lasers or a tunable laser adapted to change the excitation signal wavelength for each of the plurality of individually sensed spectroscopy signals.

In one embodiment a matrix is assembled from the plurality of individual sensed spectroscopy signals detected from a plurality of shifted detections of spectroscopy signals received from a sample. The matrix is used to decompose the plurality of individual sensed spectroscopy signals and reduce or eliminate noise, such as fluorescence and background radiation.

In one embodiment a piezoelectric-based element can be used to move (e.g., rotate) a grating of the spectrometer optical system to move the received spectroscopy signal relative to an optical sensor to provide the plurality of individual sensed spectroscopy signals from a sample.

In one embodiment, for example, the plurality of individual sensed spectroscopy signals may comprise a plurality of individually incremented measurements adapted to provide a resolution corresponding to the number of individually sensed spectroscopy signals and number of shifts of the received spectroscopy signal relative to the optical detector of the spectrometer. Thus, by shifting the received spectroscopy signal in individual increments, the resulting resolution in the decomposed spectroscopy signal may be increased over systems in which different laser wavelengths (whether resulting from different individual lasers or tunable wavelengths of a single laser) since relatively slight shifts in the received spectroscopy signal may be achieved at the optical sensor of the spectrometer versus wavelength differences between individual laser wavelengths.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 8A shows a block diagram of an example embodiment of a rotatable optical flat oriented in a generally perpendicular direction to an optical path of a spectrometer optical system.

FIG. 8B shows block diagram the optical flat shown in FIG. 8A rotated with respect to the optical path resulting in linear translation of the optical beam within the spectrometer optical system.

FIGS. 13A through 13B show graphs showing resolution comparison of a multiple-excitation wavelength system for a L-Thyroxine sample versus a system comprising a plurality of individually sensed, shifted spectroscopy signal.

DETAILED DESCRIPTION OF THE INVENTION

A spectrometer (e.g., a Raman or luminescence (e.g., fluorescence, phosphorescence, chemiluminescence) spectrometer) is provided that reduces interference caused by noise, such as fluorescence or background radiation. In various embodiments, for example, methods and systems described herein may be used to measure a plurality of Raman spectra from the same sample in sequence, without adjusting the operating conditions of an excitation laser. The plurality of Raman spectra may be shifted within an optical system of the spectrometer such that individually sensed spectra may be compared and decomposed into a single spectrum with reduced noise or even substantially free of noise (e.g., background radiation and fluorescence). Although particular types of spectrometers are described below (e.g., Raman and fluorescent), these are merely examples of spectrometers that may be used in a similar manner to reduce interference in a spectroscopy signal.

Figure 1:
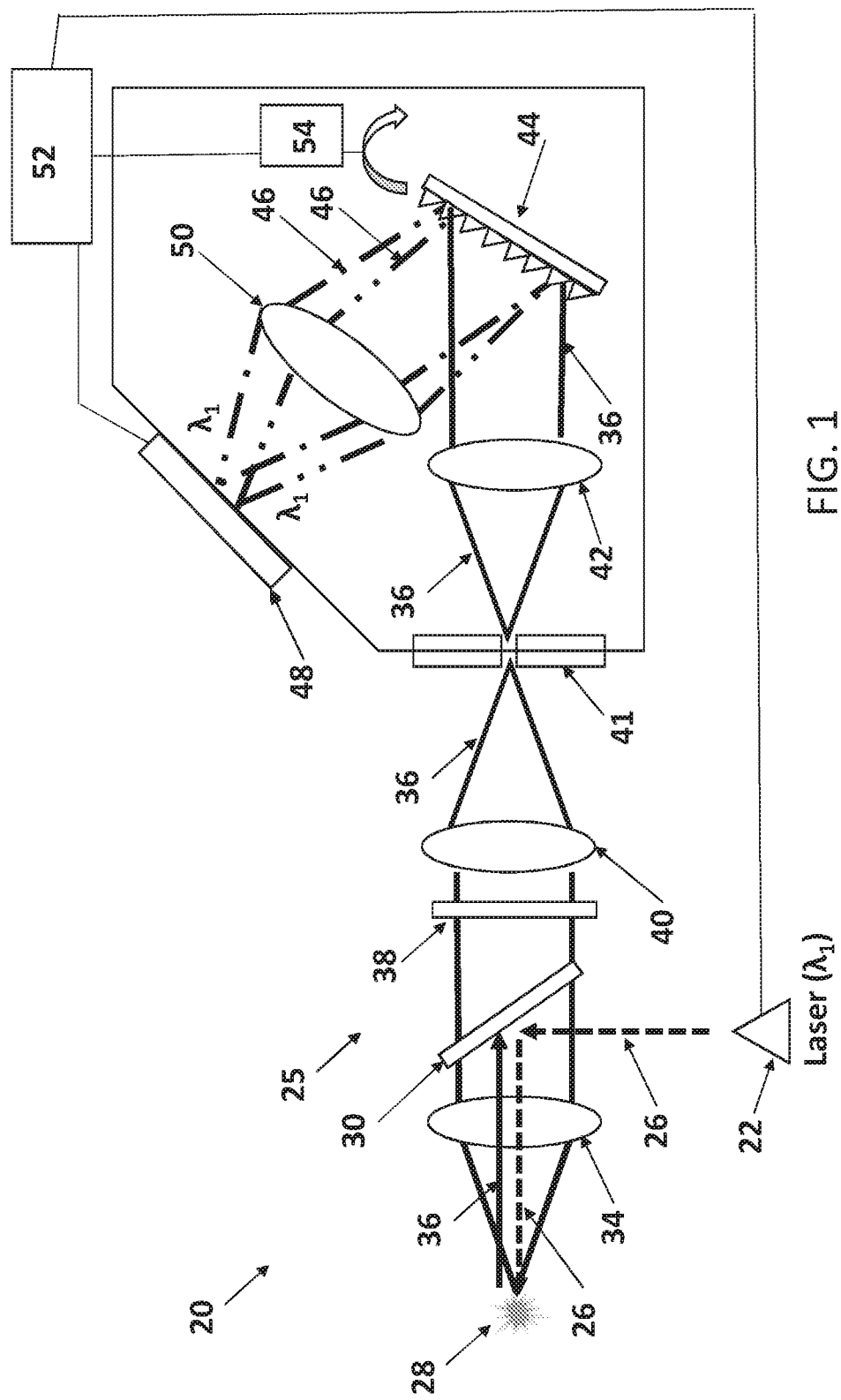
FIG. 1 is a schematic drawing of an example spectrometer comprising a movable dispersion element, such as a diffraction grating, of an optical system of the spectrometer adapted to move a spectroscopy signal relative to an optical detector of the optical system.

FIG. 1 shows a simplified schematic block diagram of an example embodiment of a spectrometer 20 configured to illuminate a sample by directing an excitation signal (e.g., an excitation light signal), receive a spectroscopy signal in return from the sample and determine a spectral component of the spectroscopy signal corresponding to one or more component(s) of the complex sample. Although the particular example shows a Raman spectrometer, other types of spectrometers, such as a luminescence spectrometer, could readily be designed based on the description herein.

As shown in FIG. 1, the spectrometer 20 comprises an excitation source 22. In a Raman spectrometer, for example, the excitation source 22 typically comprises a laser light source. In one embodiment, for example, the excitation source 22 comprises a diode laser. In the example implementation of FIG. 1, for example, the spectrometer may provide the excitation signal (e.g., an incident beam 26) from an excitation source 22, such as a laser (e.g., a diode laser) operating at a relatively consistent wavelength (e.g., $\lambda_1$).

The spectrometer 20 further comprises an optical system 25. The optical system 25 directs the incident beam 26 toward a sample 28 and receives a spectroscopy signal 36 from the sample 28. In the embodiment shown in FIG. 1, for example, the optical system 25 comprises a dichroic beam-splitter mirror 30. However, the incident beam 26 may be directed at sample 28 without any intervening instrument components located in the path of incident beam 26. The incident beam 26 also may be directed at a mirror, a holographic transmissive element, a mirror formed with a hole in the mirror or any other means for directing an incident beam known in the art.

The incident beam 26 may further be directed through a lens 34. In one embodiment, the lens 34 comprises a focusing lens in the path of the incident beam 26. The focusing lens couples the incident beam 26 with the sample 28 and collects the spectroscopy signal (e.g., Raman scattered light) from the sample. In another embodiment, more than one lens 34 may be located in the path of the incident beam 26 before the incident beam 26 contacts the sample 28. In various embodiments, the spectrometer 20 may include other optical elements for directing an incident beam 26 toward a sample and collecting a spectroscopy signal from the sample. The optical system of the spectrometer 20, for example, may include elements such as a collimated beam tube or a fiber optic waveguide. See, e.g., U.S. Pat. No. 7,403,281 for examples of collimated beam tubes or fiber optic waveguides that may be used in optical systems of various spectrometers, which is incorporated by reference as if fully set forth herein.

The incident beam 26 induces or generates on contact with the sample 28 a spectroscopy signal to be detected by the spectrometer 20. In Raman spectroscopy, for example, the incident beam 26 induces or generates on contact with the sample 28 scattered radiation having an energy differential different from, and one or more wavelengths different than, the incident radiation 26, or the Raman shift that, for convenience, is described in this document as a Raman beam or Raman signal. As stated above, and as shown in FIG. 1, in one embodiment the spectrometer 20 comprises a beam-splitter, such as a dichroic beam-splitter mirror 30. The spectroscopy signal 36 (e.g., Raman beam) is directed back through the lens 34 and the dichroic beam-splitter mirror 30 in a 180 degree back-scatter geometry. Neither the incident beam 26 nor the spectroscopy signal 36 need be co-linear. In the embodiment shown in FIG. 1, however, the spectroscopy signal 36 passes back through the dichroic beam-splitter mirror 30 and then through a filter element 38. In one embodiment, the filter element 38 comprises a long pass filter that removes extraneous radiation (e.g., from the light source 22 or another source) prior to dispersing the spectroscopy signal 36 into a spectrum. Alternatively, the filter element 38 may comprise a notch filter, or any other filter that is capable of rejecting elastically scattered radiation.

The spectroscopy signal 36 may further pass through an input focusing lens 40 that focuses the spectroscopy signal 36 to a point at a spatial filter 41. In one embodiment, for example, the spatial filter 41 comprises an aperture, slit or notch and is located at the focal point of the input focusing lens 40. The spatial filter 41 spatially filters the beam at the focal point of the input focusing lens.

The spectrometer 20 shown in FIG. 1 further comprises a collimating lens 42 that collimates the diverging spectroscopy signal 36 after it has passed through an aperture of the spatial filter 41 (e.g., an aperture, slit or notch). The collimating lens 42 further directs the re-collimated Raman beam toward a dispersing element, such as a diffraction grating 44. The diffraction grating 44 comprises an optical element that divides a Raman beam into spatial separated wavelengths. The diffraction grating 44 further directs a divided Raman beam 46 toward a detector 48. The divided Raman beam 46 passes through a detector focusing lens 50 that focuses the spatially separated wavelengths of the divided Raman beam 46 onto the detector 48.

The detector 48 comprises a transducer that converts optical energy into an electrical signal. In one embodiment, for example, the detector 48 comprises an array of individual transducers that create an electrical pattern representing the spatially separated wavelengths of the Raman spectrum. A charge-coupled device (CCD) array, for example, may be used as the detector 48 in one embodiment of the invention. In another embodiment, an Indium-Gallium-Arsenide (In-GaAs) detector 48. Other detectors, such as CMOS sensors, known in the art may also be used within a spectrometer of the present invention.

One or more actuator 54 is adapted to move the diffraction grating such as to shift the dispersed Raman signal relative to one or more sensor elements of the detector 48. The actuator, for example, may comprise a motor or other actuator, such as a piezoelectric-based element, adapted to rotate, shift or otherwise move the diffraction grating relative to the other elements of the optical system, such as the detector 48. In this manner, the dispersed Raman signal can be shifted relative to one or more sensor elements of the detector 48. In another embodiment, an actuator may be adapted to move the detector (or sensor elements of the detector 48) relative to the optical system of the spectrometer. Again, the actuator may comprise a motor or other actuator, such as a piezoelectric-based element, adapted to shift, rotate or otherwise move the detector (or sensor elements within the detector) relative to the optical system of the detector.

The spectrometer 20 further comprises control electronics 52 for controlling the operation of the spectrometer 20. The control electronics 52, for example, may comprise one or more processors, memory or other hardware programmed to control one or more operation of the spectrometer 20. The control electronics 52, for example, may control the operation of the light source 22, the actuator assembly(ies) 54, the detector 48, temperature control elements (e.g., for the light source or detector), and data transfer to and/or from the spectrometer. In one embodiment, the control electronics 52 may be integrated onto a single PC board within a housing of the spectrometer. The control electronics 52 may also comprise one or more discrete component(s) and/or one or more integrated circuit component(s).

In one embodiment, the control electronics 52 may comprise a means for communicating with an external device. The means for communicating, for example, the means form communicating may comprise a wired or wireless communication port for communicating with an external computer, personal data assistant (PDA), network or the like. A wired communication port, for example, may comprise a parallel, serial, universal serial bus (USB), FireWire™, IEEE 1394, Ethernet, modem, cable modem or other wired communication port known in the art. A wireless communication port, for example, may comprise an antenna for wireless communicating with an external device, such as via and infrared, Bluetooth, IEEE 802.11a/b/g, IrDA, a wireless modem or other wireless communication port known in the art. The control electronics 52 may be powered from a battery for a portable device or may include a power input for receiving power from an external supply as known in the art. A battery or power supply circuit (e.g., a rectifier) may be located within a housing of the spectrometer 20.

In Raman spectroscopy, the spectrometer 20 operates to detect a Raman spectrum of a sample 28. In order to detect the Raman spectrum, the light source 22 is activated to generate an incident beam 26 of excitation radiation, such as generating a laser incident beam in a laser light source. In one embodiment, for example, the temperature of the light source 22 is controlled to control the output frequency of the incident beam 26 generated by the light source 22. The incident beam 26 of excitation radiation passes through the filter 24, which removes spurious emissions from the incident beam. The incident beam 26 is reflected off the beam-splitter mirror 30 toward the sample 28. The incident beam 26 is focused onto the sample 28 by the output focusing lens 34.

The incident beam 26 generates Raman scattered light from the sample 28. The Raman scattered light is received by the output focusing lens 34 and transmitted back through the beam-splitter mirror 30. In this embodiment, the beam-splitter mirror 30 passes the Raman scattered light through the mirror 30 to the filter 38. From the filter 38, the Raman scattered light passes through the input focusing lens 40 and is focused onto a spatial filter 41 such as an aperture, slit or notch. The Raman scattered light is spatially filtered and diverges toward the collimating lens 42. The collimating lens 42 collimates the diverging Raman scattered light and transmits the light to the diffraction grating 44, which divides the Raman scattered light into spatial separated wavelengths and directs the wavelengths towards the detector element 48. The spatially separated wavelengths of the Raman scattered light pass through the detector focusing lens 50 and are focused into a focused band of radiation that represents the spatially separated wavelengths of the Raman scattered light. The focused band of radiation is further directed by the detector focusing lens 50 onto the detector 48.

In this particular implementation, the detector 48 comprises an array of individual transducers that each generate an electrical signal corresponding to intensity of the radiation received at each of the individual transducers. The electrical signals generated at the individual transducers of the detector represents the spatially separated wavelengths of the Raman spectrum of the sample 28. The electrical signals are read from the detector by the control electronics 52. In one embodiment, for example, the spectrometer 20 may then present the Raman spectrum detected to a user such as via a display or indicator on the spectrometer itself. In another embodiment, the control electronics of the spectrometer 20 may comprise a look-up table stored in a data storage element (e.g., memory, tape or disk drive, memory stick or the like). In this embodiment, the control electronics 52 compares the signal from the detector with the values stored in the look-up table to determine a result of the Raman scan. The spectrometer 20 then presents the result to a user such as via a display or indicator on the spectrometer. The result, for example, may indicate the presence or absence of one or more chemicals or substances in the sample and may further indicate an amount or concentration of a chemical or substance detected by the spectrometer.

In other implementations, the detector 48 may comprise one or more individual transducers that rapidly scan for one or more anticipated spectral features (e.g., Raman features). An example such system is disclosed in U.S. patent application Ser. No. 13/161,485 entitled "Spectrometer" and filed by Canon et al. on Jun. 15, 2011, which is hereby incorporated herein by reference in its entirety for all that it teaches and suggests.

As describe above, the spectrometer comprises an optical system adapted to receive a spectroscopic signal and alter that signal by moving one or more component of the optical system relative to one or more other element of the optical system to shift the spectroscopy signal relative to an optical sensor (e.g., a CCD array sensor). In one embodiment, for example, an actuator 54 is adapted to move one or more component of the optical system (e.g., a movable grating, such as a rotating grating, or an optical system component, such as an aperture) is provided that can shift the spectroscopy signal relative to the optical sensor. In another embodiment, an actuator is adapted to move the optical sensor relative to the optical system of the spectrometer to shift the received Raman signal relative to elements of the sensor. In other embodiments, both one or more components of the optical system (e.g., the grating and/or aperture) and the optical sensor may be moved relative to each other. In yet other embodiments, one or more other components of the optical system may be used to shift the spectroscopy signal relative to the optical sensor alone or in combination with one or both of a grating and a sensor.

In some embodiments, a plurality of excitation cycles may be obtained by a single laser operating at a generally consistent excitation frequency. One or more moveable component of the optical system of the spectrometer may be adapted to shift a received spectroscopy signal relative to an optical sensor of the spectrometer optical system. The plurality of individual sensed spectroscopy signals may be received in differing relative positions of the optical sensor to provide the plurality of individual sensed spectroscopy signals (e.g., by different corresponding locations or sensing elements of the optical sensor). A decomposed spectroscopy signal may be obtained based on the plurality of individual spectroscopy signals received. The decomposed spectroscopy signal may, for example, may reduce or eliminate noise, such as fluorescence and background radiation, without the need for multiple lasers or a tunable laser adapted to change the excitation signal wavelength for each of the plurality of individually sensed spectroscopy signals.

In one embodiment a matrix is assembled from the plurality of individual sensed spectroscopy signals detected from a plurality of shifted detections of spectroscopy signals received from a sample. The matrix is used to decompose the plurality of individual sensed spectroscopy signals and reduce or eliminate noise, such as fluorescence and background radiation.

Figure 2A:
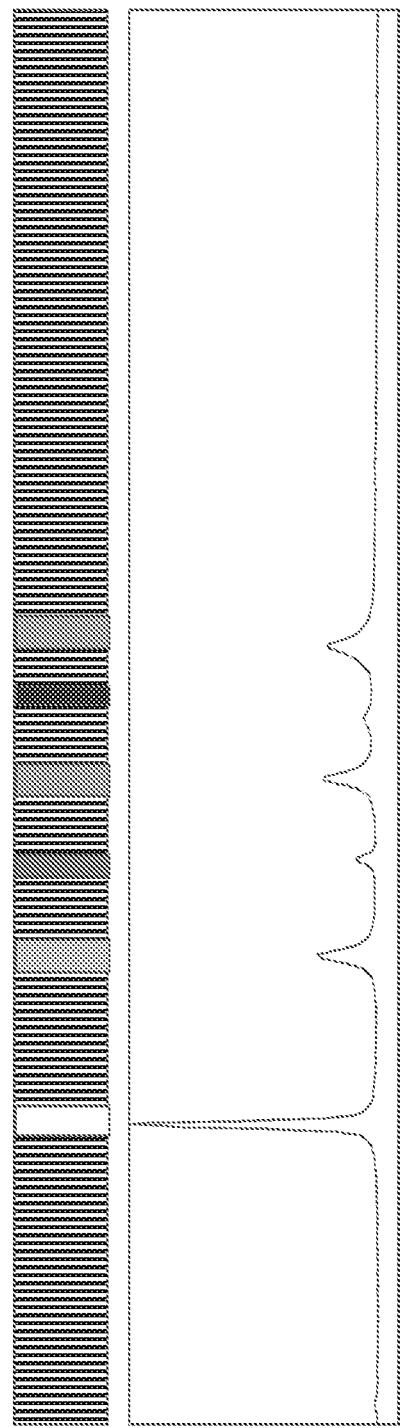
FIG. 2 is a schematic drawing of an example multichannel detector adapted for use in a spectrometer.
Figure 2B:
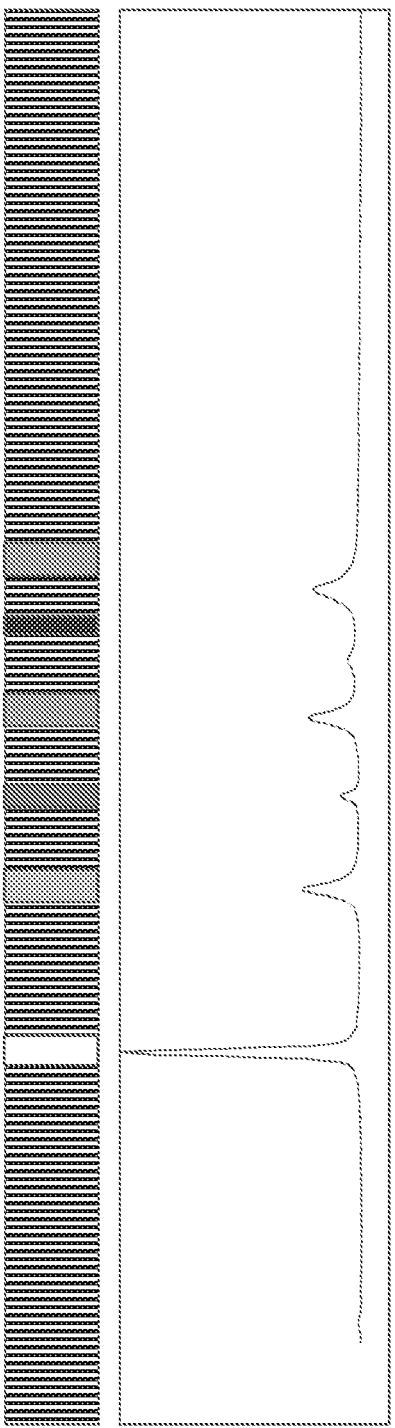

FIGS. 2A and 2B show schematic drawings of an example multichannel detector of a spectrometer adapted to be imaged with a first spectroscopy signal and a second spectroscopy signal shifted relative to the first spectroscopy signal, respectively. In this example, FIG. 2A shows a first individually sensed spectroscopy signal is diffracted onto the multichannel detector at a first position (corresponding to a first optical system intermediate component position (e.g., grating rotation position) and/or detector position) such that one or more peaks or other diffracted components of the first spectroscopy signal is imaged on the sensor elements of the detector at a first position. FIG. 2B shows a second individually sensed spectroscopy that is diffracted onto the multichannel detector at a second position (corresponding to the first optical system intermediate component position and/or detector position). In FIG. 2B, the one or more peaks or other diffracted components of the second spectroscopy signal is imaged on the sensor elements of the detector at a second, shifted/displaced position corresponding to different sensor elements/channels of the multichannel detector than the corresponding peaks or other diffracted components of the first spectroscopy signal shown in FIG. 2A.

Figure 3:
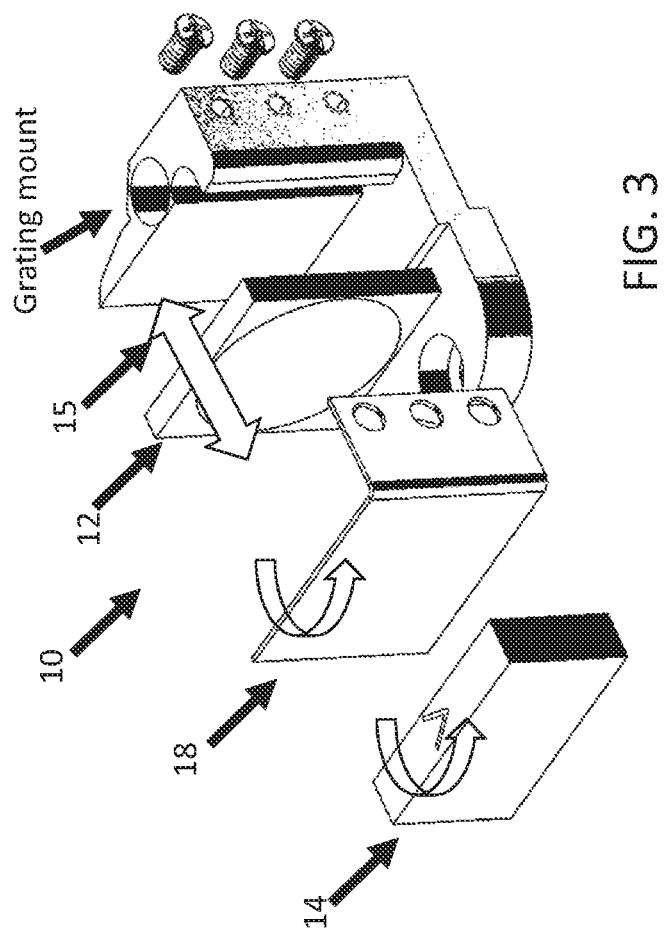
FIG. 3 shows a schematic drawing showing an exploded view of a piezoelectric-based element adapted for moving an optical element of a spectrometer.
Figure 4:
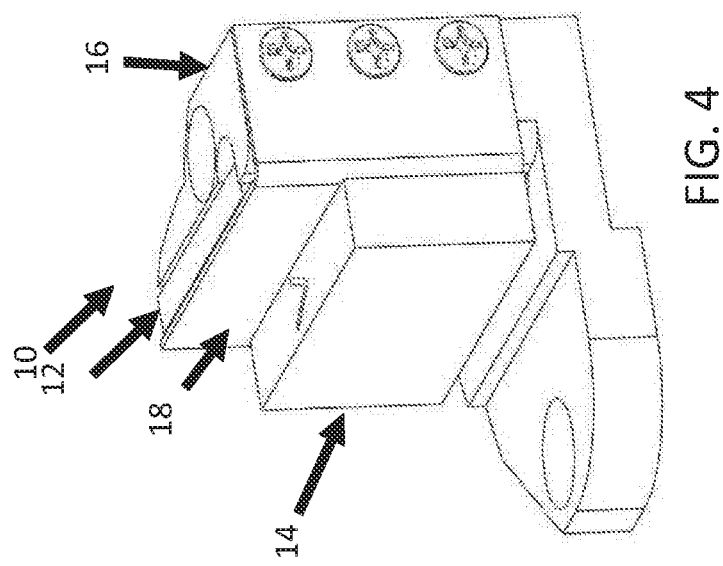
FIG. 4 shows a schematic drawing showing a perspective view of an assembled piezoelectric-based element adapted for moving an optical element of a spectrometer.

FIG. 3 shows an exploded perspective view of a piezoelectric-based element 10 adapted for moving an optical element of a spectrometer, such as a diffractive grating 14. FIG. 4 shows an assembled perspective view of the piezoelectric-based element 10 adapted for moving an optical element of a spectrometer. In this particular embodiment, for example, the piezoelectric-based element 10 comprises a grating mount for supporting a diffractive grating 14 within the optical system of the spectrometer. A piezoelectric element 12 is coupled to and supported by the grating mount 16. The piezoelectric element is disposed such as to provide a linear force along an axis 15 based on an electric signal (e.g., received from one or more control electronics 52 of the spectrometer). The linear force is applied against a flexible element 18 also mounted to the grating mount. In one embodiment, for example, the flexible element 18 (e.g., a bendable sheet metal element, bending polymeric element) is disposed adjacent to the piezoelectric element 12 and is fixed to the grating mount 16 to act like a cantilever beam. A diffraction grating 14, in this embodiment, is mounted or coupled to the flexible element 18 such that as the piezoelectric element 12 moves along the axis, the piezoelectric element 12 flexes the flexible element 18 causing the flexing element 18 to flex relative to a fixed portion of the flexible element 18 and, in turn, cause the diffraction element 14 to rotate relative to one or more other elements (e.g., the detector) of the spectrometer optical system. In one implementation, for example, a diffraction grating 14 is secured (e.g., via an adhesive or connector) to a flexing element 18. One portion (e.g., an end) of the flexing element 18 is connected (e.g., bolted, screwed, welded, fused, adhered, or otherwise connected) to the grating mount 16. A piezoelectric element 12 is secured (e.g., via an adhesive or connector) to the grating mount 16. The grating mount 16 is connected to the spectrometer (e.g., to a frame or other portion of the spectrometer). In this example, the grating mount 16 is movable relative to the remaining optical components of the spectrometer.

Although FIGS. 3 and 4 show a piezoelectric element and/or stack 12 as an actuator, other devices may also be used, such as but not limited to a motor, a squiggle motor, a voice coil, a galvanometer, a PCB motor, a rotary motor, or any other mechanical device adapted to rotate a grating relative to a sensor of the spectrometer. Similarly, although FIGS. 3 and 4 show a dispersion element 14 attached to the flexing element, other rotating components of the optical system such as an optical flat, a mirror or the like may be mounted to the flexing element.

Figure 5:
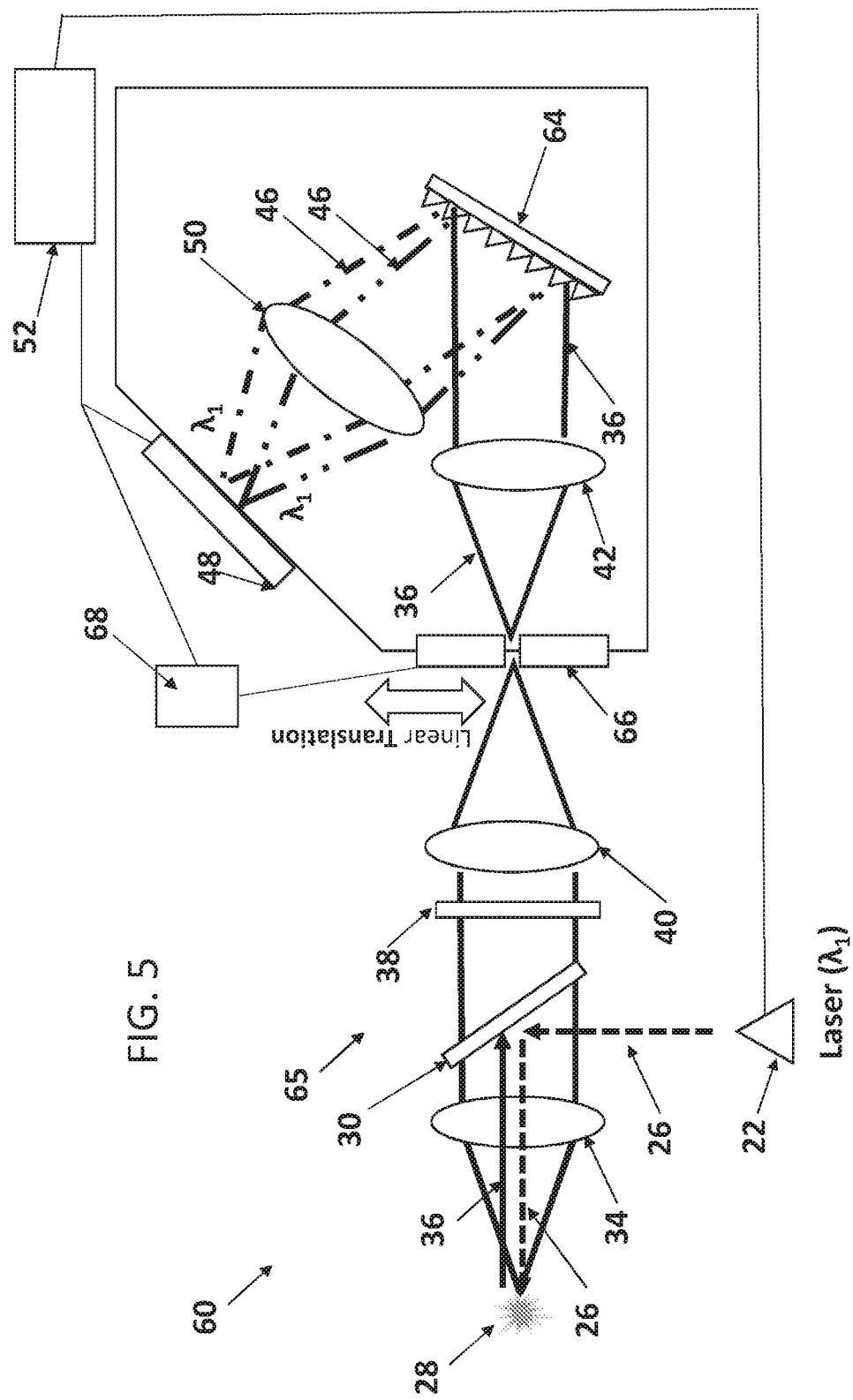
FIG. 5 shows a block diagram of an alternative example embodiment of a spectrometer.

FIG. 5 shows a block diagram of an alternative example embodiment of a spectrometer 60 configured to illuminate a sample by directing an excitation signal (e.g., an excitation light signal), receive a spectroscopy signal in return from the sample and determine a spectral component of the spectroscopy signal corresponding to one or more component(s) of the sample. Although the particular example shows a Raman spectrometer, other types of spectrometers, such as a luminescence spectrometer, could readily be designed based on the description herein. Components of the spectrometer 60 similar to those shown with respect to the spectrometer of FIG. 1 are labeled with the same reference numbers.

The spectrometer 60 comprises an excitation source 22 that provides an excitation incident beam 26 to a sample via an optical system 65. The optical system 65 directs the incident beam 26 toward a sample 28 and receives a spectroscopy signal 36 from the sample 28.

The optical system 65 comprises an input focusing lens 40 that focuses the spectroscopy signal 36 to a point at a spatial filter 66. In one embodiment, for example, the spatial filter 66 comprises an aperture, slit or notch and is generally located at the focal point of the input focusing lens 40. The spatial filter 66 spatially filters the beam at the focal point of the input focusing lens.

In FIG. 5, an actuator 68 is adapted to move the spatial filter 66 with respect to one or more other components of the optical system 65, such as the optical detector 48. In the embodiment shown in FIG. 5, for example, the filter 66 is translatable with respect to an optical path of the spectroscopy signal traveling through the optical system 65. An actuator 70 is adapted to move the filter 66, such as shown in FIG. 5. The actuator may comprise any type of actuator, such as but not limited to a motor, a squiggle motor, a voice coil, a galvanometer, a PCB motor, a rotary motor, or any other mechanical device adapted to translate the filter 66 relative to the optical path and/or the detector of the optical system 65.

A collimating lens 42 collimates the diverging spectroscopy signal 36 after it has passed through an aperture of the spatial filter 66. The collimating lens 42 further directs the re-collimated Raman beam toward a dispersing element, such as a diffraction grating 64. The diffraction grating 64 comprises an optical element that divides a Raman beam into spatial separated wavelengths and directs the divided Raman beam 46 toward a detector 48. The divided Raman beam 46 passes through a detector focusing lens 50 that focuses the spatially separated wavelengths of the divided Raman beam 46 onto the detector 48.

The spectrometer 60 further comprises control electronics 52 for controlling the operation of the spectrometer 60. The control electronics 52, for example, may control the operation of the light source 22, the actuator assembly(ies) 70, the detector 48, temperature control elements (e.g., for the light source or detector), and data transfer to and/or from the spectrometer.

The spectrometer 60 comprises an optical system 65 adapted to receive a spectroscopic signal and alter that signal by moving one or more component of the optical system relative to one or more other element of the optical system to shift the spectroscopy signal relative to an optical sensor (e.g., a CCD array sensor). In this embodiment, for example, an actuator 70 adapted to move one or more component of the optical system (e.g., linearly translating a spatial filter 66) is provided to shift the spectroscopy signal relative to the optical sensor.

A plurality of excitation cycles may be obtained by a single laser operating at a generally consistent excitation frequency (e.g., $\lambda_1$). A linearly translatable spatial filter 66 is adapted to shift a received spectroscopy signal relative to an optical sensor 48 of the spectrometer optical system 65. The plurality of individual sensed spectroscopy signals may be received in differing relative positions of the optical sensor to provide the plurality of individual sensed spectroscopy signals (e.g., by different corresponding locations or sensing elements of the optical sensor). A decomposed spectroscopy signal may be obtained based on the plurality of individual spectroscopy signals received. The decomposed spectroscopy signal may, for example, may reduce or eliminate noise, such as fluorescence and background radiation, without the need for multiple lasers or a tunable laser adapted to change the excitation signal wavelength for each of the plurality of individually sensed spectroscopy signals.

Figure 6:
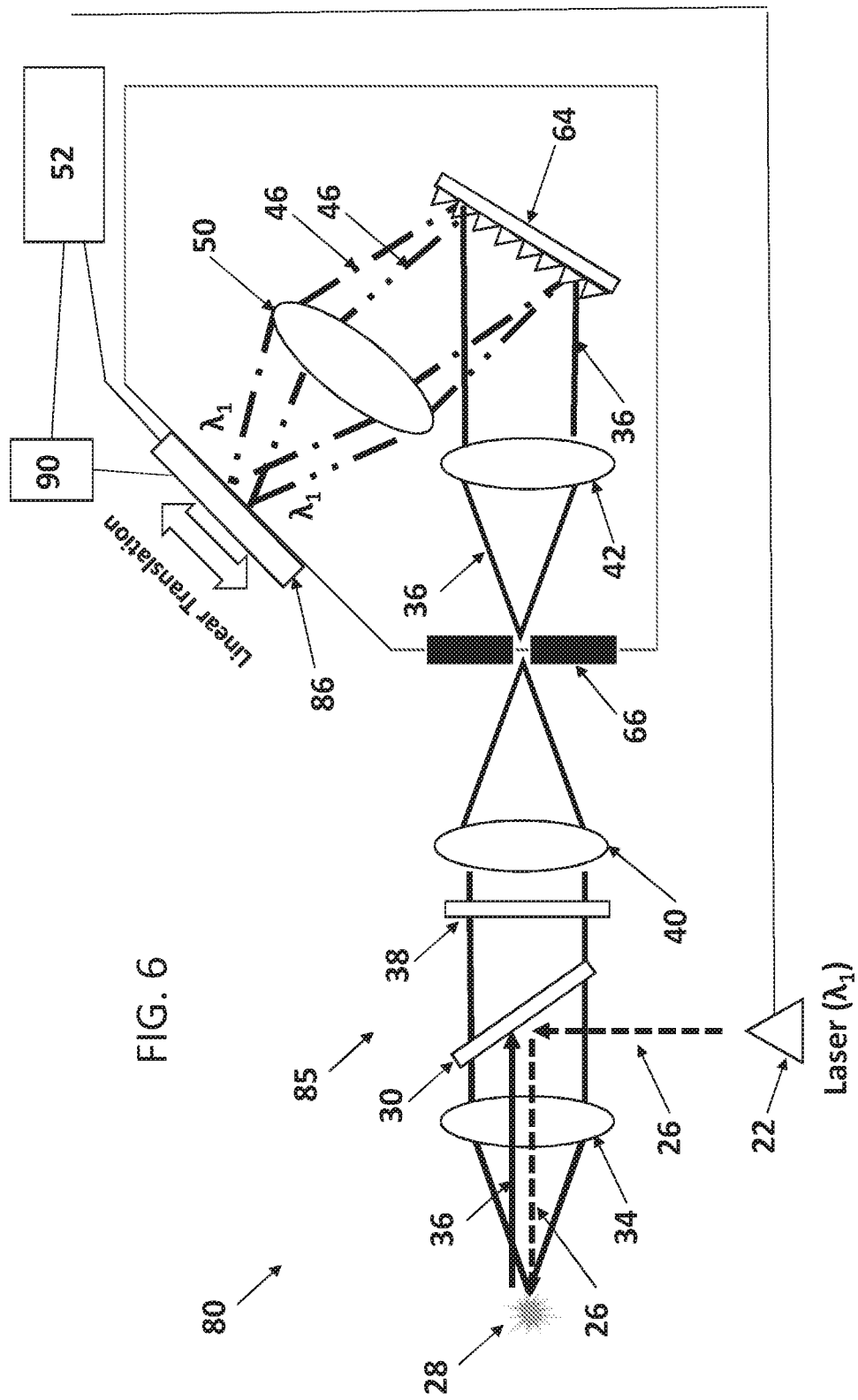
FIG. 6 shows a block diagram of another example embodiment of a spectrometer.

FIG. 6 shows a block diagram of another example embodiment of a spectrometer 80 configured to illuminate a sample by directing an excitation signal (e.g., an excitation light signal), receive a spectroscopy signal in return from the sample and determine a spectral component of the spectroscopy signal corresponding to one or more component(s) of the sample. Components of the spectrometer 80 similar to those shown with respect to the spectrometer of FIGS. 1 and 5 are labeled with the same reference numbers.

The spectrometer 80 comprises an excitation source 22 that provides an excitation incident beam 26 to a sample via an optical system 65. The optical system 65 directs the incident beam 26 toward a sample 28 and receives a spectroscopy signal 36 from the sample 28.

The optical system 65 comprises an input focusing lens 40 that focuses the spectroscopy signal 36 to a point at a spatial filter 66. In one embodiment, for example, the spatial filter 66 comprises an aperture, slit or notch and is generally located at the focal point of the input focusing lens 40. The spatial filter 66 spatially filters the beam at the focal point of the input focusing lens.

A collimating lens 42 collimates the diverging spectroscopy signal 36 after it has passed through an aperture of the spatial filter 66. The collimating lens 42 further directs the re-collimated Raman beam toward a dispersing element, such as a diffraction grating 64. The diffraction grating 44 comprises an optical element that divides a Raman beam into spatial separated wavelengths and directs the divided Raman beam 46 toward a detector 86. The divided Raman beam 46 passes through a detector focusing lens 50 that focuses the spatially separated wavelengths of the divided Raman beam 46 onto the detector 86.

In FIG. 6, an actuator 90 is adapted to move the detector 86 with respect to one or more other components of the optical system 85, such as the diffraction grating 64. In the embodiment shown in FIG. 5, for example, the detector 86 is translatable with respect to an optical path of the spectroscopy signal traveling toward the detector 86 of the optical system 85. The actuator 90 is adapted to move the detector 66, such as shown in FIG. 6. The actuator may comprise any type of actuator, such as but not limited to a motor, a squiggle motor, a voice coil, a galvanometer, a PCB motor, a rotary motor, or any other mechanical device adapted to translate the detector 86 relative to the optical path within the optical system 85.

The spectrometer 80 further comprises control electronics 52 for controlling the operation of the spectrometer 80. The control electronics 52, for example, may control the operation of the light source 22, the actuator assembly(ies) 90, the detector 88, temperature control elements (e.g., for the light source or detector), and data transfer to and/or from the spectrometer.

The spectrometer 80 comprises an optical system 85 adapted to receive a spectroscopic signal and alter that signal by moving one or more component of the optical system relative to one or more other element of the optical system to shift the spectroscopy signal relative to an optical sensor (e.g., a CCD array sensor). In this embodiment, for example, an actuator 70 adapted to move one or more component of the optical system (e.g., linearly translating a detector 88) is provided to shift the spectroscopy signal relative to the optical sensor.

A plurality of excitation cycles may be obtained by a single laser operating at a generally consistent excitation frequency (e.g., $\lambda_1$). A linearly translatable detector 88 is adapted to shift a received spectroscopy signal relative to an optical path of the spectrometer optical system 85. The plurality of individual sensed spectroscopy signals may be received in differing relative positions of the optical sensor to provide the plurality of individual sensed spectroscopy signals (e.g., by different corresponding locations or sensing elements of the optical sensor). A decomposed spectroscopy signal may be obtained based on the plurality of individual spectroscopy signals received. The decomposed spectroscopy signal may, for example, may reduce or eliminate noise, such as fluorescence and background radiation, without the need for multiple lasers or a tunable laser adapted to change the excitation signal wavelength for each of the plurality of individually sensed spectroscopy signals.

Figure 7:
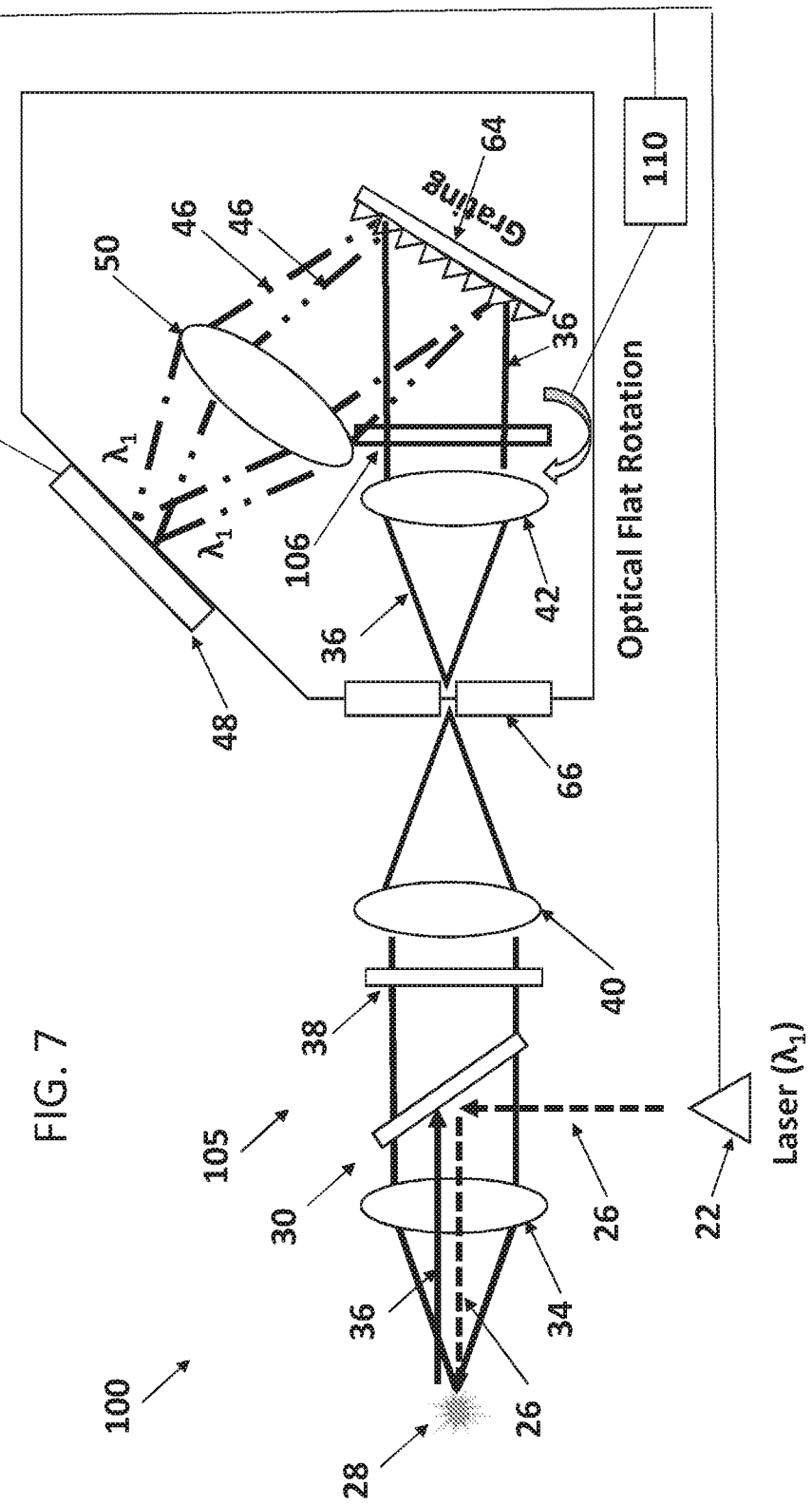
FIG. 7 shows a block diagram of yet another example embodiment of a spectrometer.

FIG. 7 shows a block diagram of yet another example embodiment of a spectrometer 100 configured to illuminate a sample by directing an excitation signal (e.g., an excitation light signal), receive a spectroscopy signal in return from the sample and determine a spectral component of the spectroscopy signal corresponding to one or more component(s) of the sample. Components of the spectrometer 100 similar to those shown with respect to the spectrometer of FIGS. 1, 5 and 6 are labeled with the same reference numbers.

The spectrometer 100 comprises an excitation source 22 that provides an excitation incident beam 26 to a sample via an optical system 105. The optical system 105 directs the incident beam 26 toward a sample 28 and receives a spectroscopy signal 36 from the sample 28.

The optical system 105 comprises an input focusing lens 40 that focuses the spectroscopy signal 36 to a point at a spatial filter 66. In one embodiment, for example, the spatial filter 66 comprises an aperture, slit or notch and is generally located at the focal point of the input focusing lens 40. The spatial filter 66 spatially filters the beam at the focal point of the input focusing lens.

A collimating lens 42 collimates the diverging spectroscopy signal 36 after it has passed through an aperture of the spatial filter 66. The collimating lens 42 further directs the re-collimated Raman beam toward an optical flat 106 and onto a dispersing element, such as a diffraction grating 64. The diffraction grating 64 comprises an optical element that divides a Raman beam into spatial separated wavelengths and directs the divided Raman beam 46 toward a detector 48. The divided Raman beam 46 passes through a detector focusing lens 50 that focuses the spatially separated wavelengths of the divided Raman beam 46 onto the detector 48.

In FIG. 7, an actuator 110 is adapted to move the optical flat 106 with respect to one or more other components of the optical system 105, such as the detector 48 and/or the diffraction grating 64. In the embodiment shown in FIG. 7, for example, the optical flat 106 is rotatable with respect to an optical path of the spectroscopy signal traveling toward the detector 48 of the optical system 85. The actuator 110 is adapted to move the optical flat 106, such as shown in FIG. 7. The actuator may comprise any type of actuator, such as but not limited to a motor, a squiggle motor, a voice coil, a galvanometer, a PCB motor, a rotary motor, or any other mechanical device adapted to translate the detector 86 relative to the optical path within the optical system 105.

The spectrometer 100 further comprises control electronics 52 for controlling the operation of the spectrometer 100. The control electronics 52, for example, may control the operation of the light source 22, the actuator assembly(ies)

110, the detector 48, temperature control elements (e.g., for the light source or detector), and data transfer to and/or from the spectrometer.

The spectrometer 100 comprises an optical system 105 adapted to receive a spectroscopic signal and alter that signal by moving one or more component of the optical system relative to one or more other element of the optical system to shift the spectroscopy signal relative to an optical sensor (e.g., a CCD array sensor). In this embodiment, for example, an actuator 110 is adapted to move one or more component of the optical system (e.g., rotating the optical flat 106) is provided to shift the spectroscopy signal relative to the optical sensor.

A plurality of excitation cycles may be obtained by a single laser operating at a generally consistent excitation frequency (e.g., $\lambda_1$). A rotatable optical flat 106 is adapted to shift a received spectroscopy signal relative to an optical sensor 48 of the spectrometer optical system 105. The plurality of individual sensed spectroscopy signals may be received in differing relative positions of the optical sensor to provide the plurality of individual sensed spectroscopy signals (e.g., by different corresponding locations or sensing elements of the optical sensor). A decomposed spectroscopy signal may be obtained based on the plurality of individual spectroscopy signals received. The decomposed spectroscopy signal may, for example, may reduce or eliminate noise, such as fluorescence and background radiation, without the need for multiple lasers or a tunable laser adapted to change the excitation signal wavelength for each of the plurality of individually sensed spectroscopy signals.

FIGS. 8A and 8B show a block diagram of an example embodiment of a rotatable optical flat 106, such as shown in FIG. 7. FIG. 8A shows an optical flat 106 oriented in a generally perpendicular direction to an optical path of an optical system 105. In this orientation the optical path continues generally straight as shown in FIG. 8A. FIG. 8B shows the optical flat 106 rotated with respect to the optical path resulting in linear translation of the optical beam within the optical system 105. The linearly translated optical beam is directed toward the diffraction grating and results in a linearly shifted beam on the detector 48.

Figure 9A:
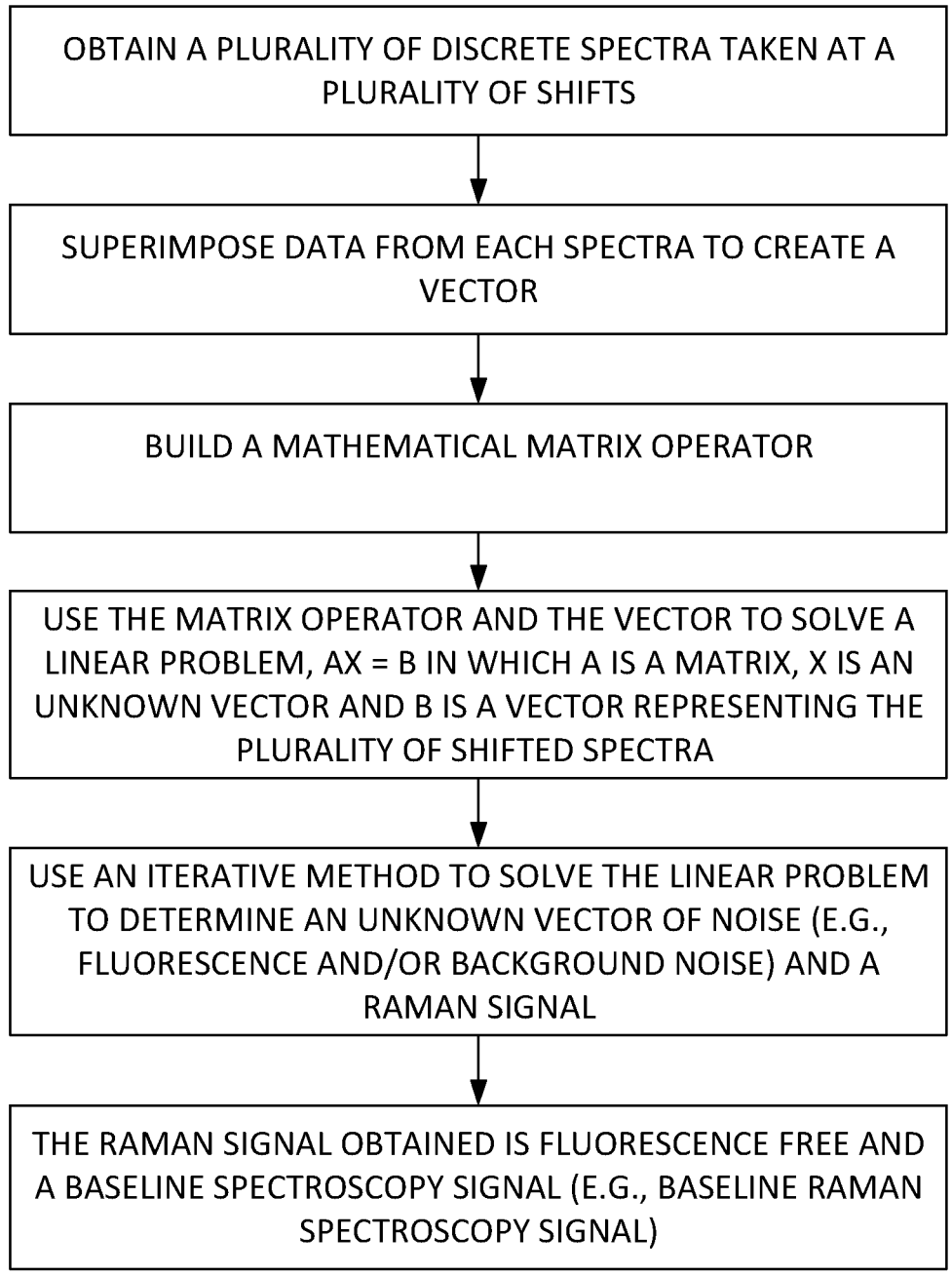
FIG. 9A shows a flowchart of an example method to remove or eliminate noise, such as fluorescence and/or background radiation, from a plurality of spectroscopy signals shifted with respect to one another within an optical system of a spectrometer.

FIG. 9A shows a flowchart of an example method to remove or eliminate noise, such as fluorescence and/or background radiation, from a plurality of spectroscopy signals shifted with respect to one another within an optical system of a spectrometer. In this method, a first spectrum (of the plurality of spectra) is collected for a first spectroscopy signal imaged on a detector of a spectrometer. A second spectrum (of the plurality of spectra) is collected for a second spectroscopy signal imaged on the detector that is shifted relative to the detector. In one embodiment, for example, the first and second spectroscopy signals are diffracted onto a surface of the detector at a first position and a second position, respectively. The shift may be accomplished by moving one or more component of an optical system of the spectrometer (e.g., a dispersion element, the detector, a filter, an optical flat, micro-electromechanical system (MEMS) element, a mirror, or the like). Although two spectra are described, any number of shifted spectra may be obtained. Data from the plurality of detected shifted spectroscopy signals is superimposed to create a vector representing the plurality of detected shifted spectroscopy signals. A mathematical matrix operator is also built. The matrix operator and the vector are used to solve a linear problem, $Ax=B$, where A is a matrix, x represents an unknown vector, and B represents the plurality of detected shifted spectra. In one variation, an iterative method may be used to solve the linear problem that determines an unknown vector of noise (e.g., fluorescence and/or background noise) and a Raman signal. The matrix represents identity matrices of non-shifted background spectrum from the plurality of shifted spectra measurements. The Raman signal obtained is noise (fluorescence and/or background noise) free and is a baseline spectroscopy signal (e.g., baseline Raman spectroscopy signal).

Figure 9B:
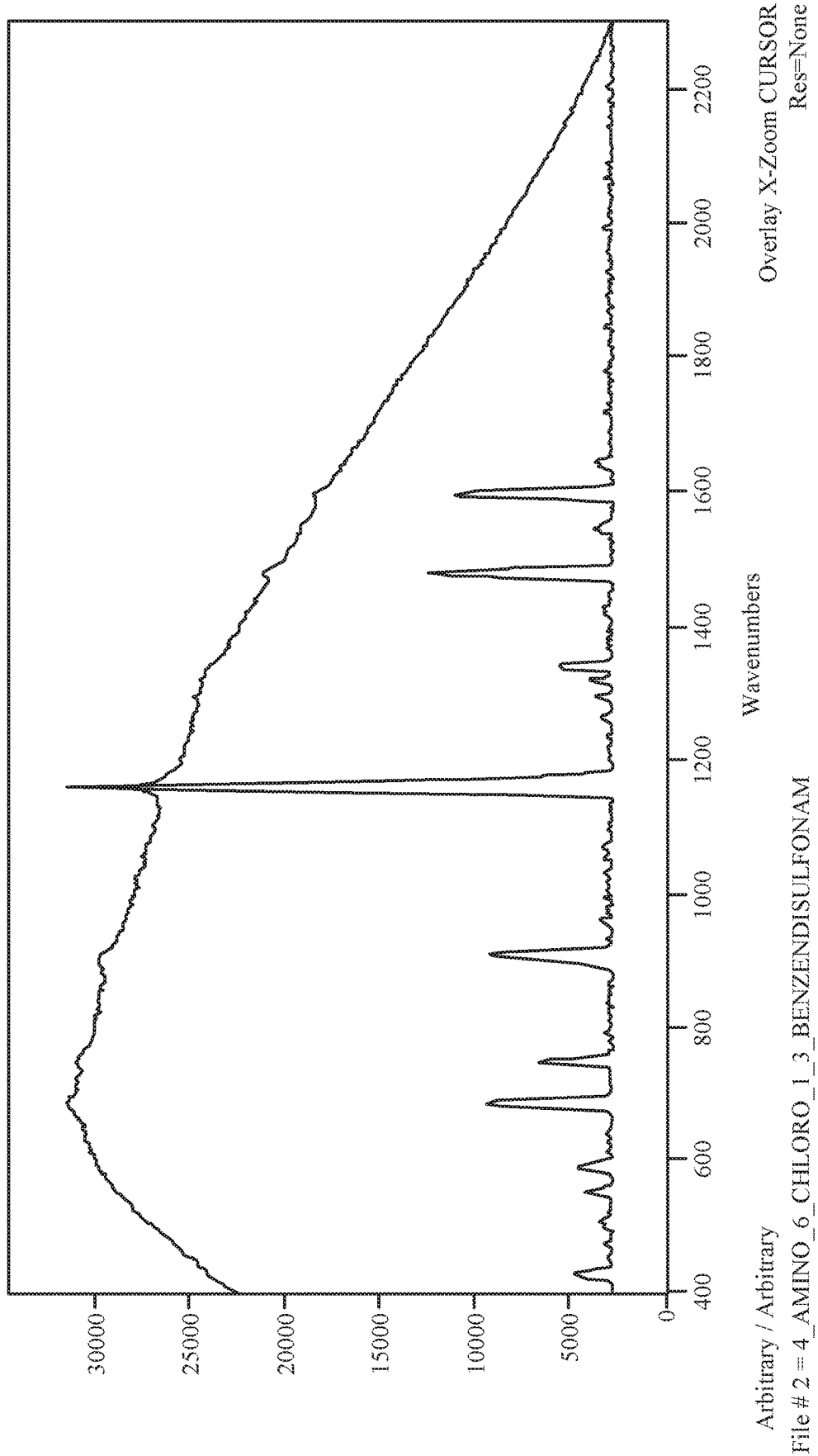
FIG. 9B is a graph showing a detected Raman spectrum for 4-Amino-6-chloro-1,3-benzendisulfonamide and an underlying baseline Raman spectrum determined by the method shown in FIG. 9A.

FIG. 9B is a graph showing a detected Raman spectrum for 4-Amino-6-chloro-1,3-benzendisulfonamide and an underlying baseline Raman spectrum determined by the method shown in FIG. 9A. The measured spectrum 200 comprises an underlying Raman signal as well as various noise components, such as fluorescence and background noise. By shifting the signal and determining the separate noise vector and the Raman signal, the underlying baseline Raman signal 205 is shown. As can be seen in FIG. 9B, the resulting Raman signal is a baseline spectrum that can be accurately compared to a library.

Figure 9C:
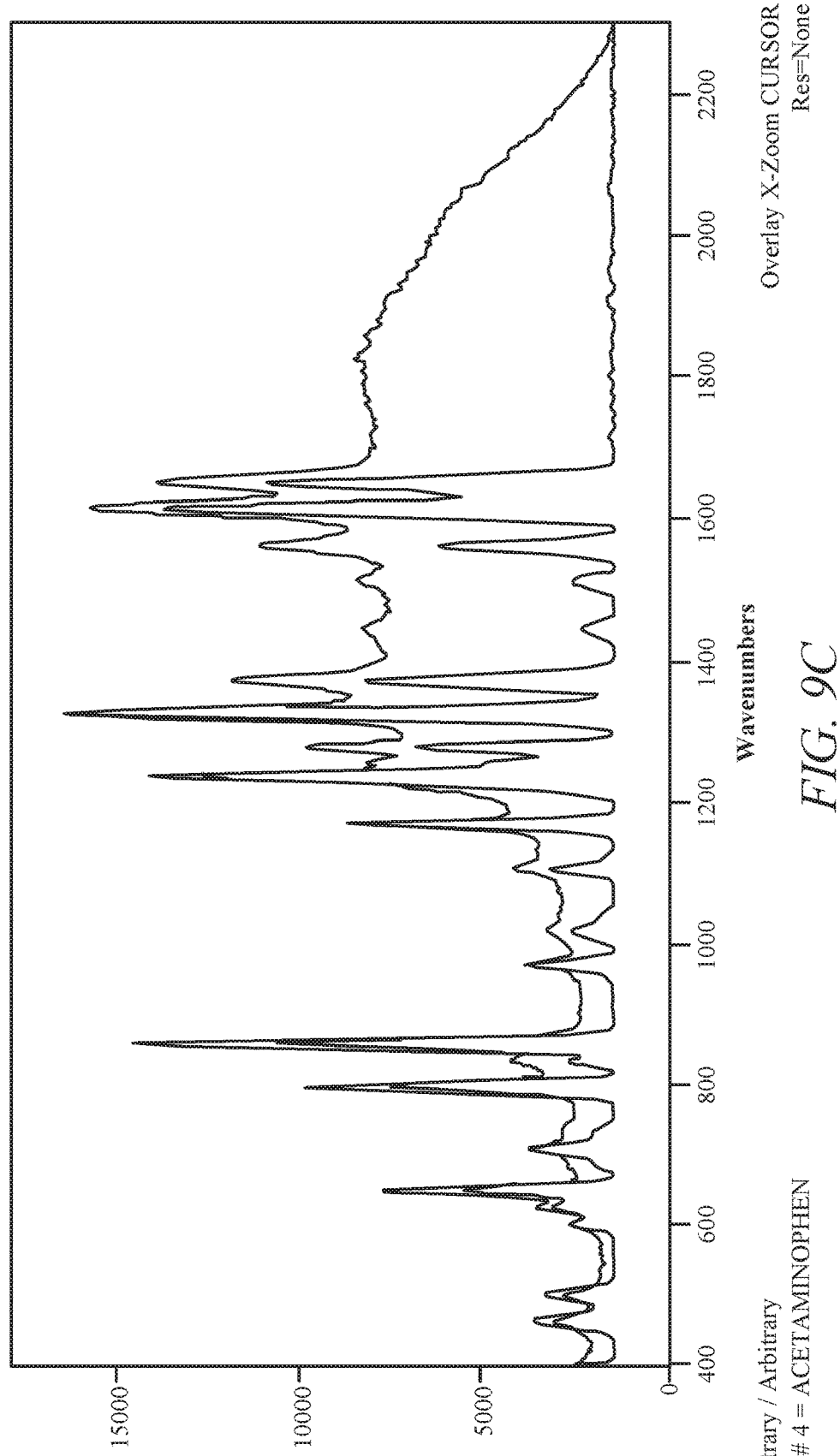
FIG. 9C is a graph showing a detected Raman spectrum for Acetaminophen and an underlying baseline Raman spectrum determined by the method shown in FIG. 9A.

FIG. 9C is a graph showing a detected Raman spectrum for Acetaminophen and an underlying baseline Raman spectrum determined by the method shown in FIG. 9A. The measured spectrum 210 comprises an underlying Raman signal as well as various noise components, such as fluorescence and background noise. By shifting the signal and determining the separate noise vector and the Raman signal, the underlying baseline Raman signal 215 is shown. As can be seen in FIG. 9C, the resulting Raman signal is a baseline spectrum that can be accurately compared to a library.

Comparing FIGS. 9B and 9C, it can be seen that the detected spectrum for 4-Amino-6-chloro-1,3-benzendisulfonamide shown in FIG. 9B includes a stronger noise component that obscures the underlying Raman signal than the detected spectrum for Acetaminophen shown in FIG. 9C. In either case, however, a clean baseline Raman spectrum is determined.

Other methods such as Shifted Excitation Raman Difference Spectroscopy (SERDS) may also be used to obtain an isolated background spectrum from a plurality of individually sensed spectroscopy signals.

Figure 10:
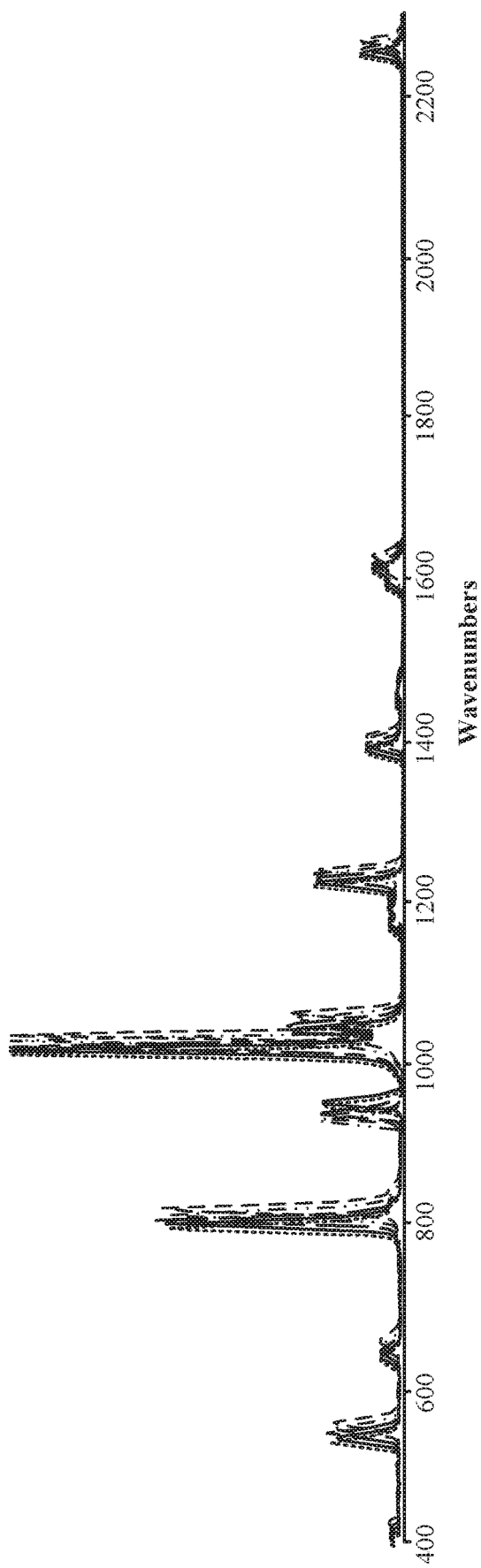
FIG. 10 shows a graph of a plurality of individually sensed, shifted spectroscopy signals of a sample.

FIG. 10 shows a graph of a plurality of individually sensed, shifted spectroscopy signals of a sample. In this graph, wavenumbers of the individually detected spectroscopy signals detected at a spectrometer detector element are shown across an X-axis and an amplitude of the spectroscopy signals are shown along a Y-axis. As can be seen in FIG. 5, for example, a plurality of relatively small shifted steps can be achieved without using a plurality of lasers or a tunable laser. In various embodiments, for example, distinct measurements of shifted individual spectroscopy signal may comprise any number of measurements, such as between five and fifty samples, between ten and forty samples, between twenty and thirty samples.

Figure 11:
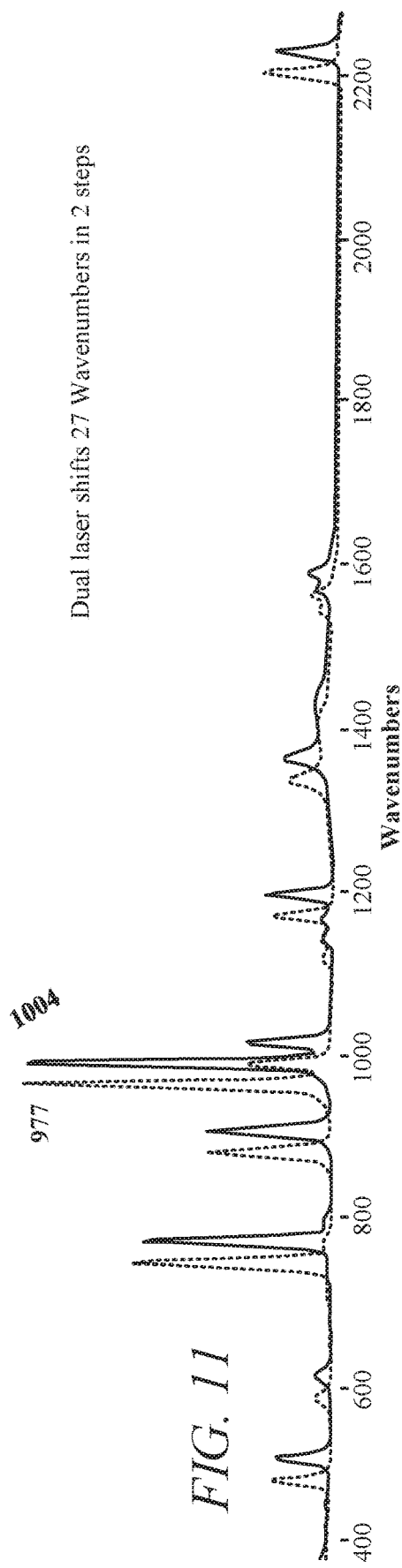
FIG. 11 shows another graph of a plurality of individually sensed, shifted spectroscopy signals of a sample.

FIG. 11 shows another graph of a plurality of individually sensed, shifted spectroscopy signals of a sample. In this particular example, two measurements shifted by 27 wavenumbers are shown in which dominant peaks of a spectroscopy signal comprise wavenumbers of 977 nm and 1004 nm. In this particular example, closely spaced lasers at 783 nm and 785 nm provide two spectra shifted by 27 wavenumbers.

Figure 12:
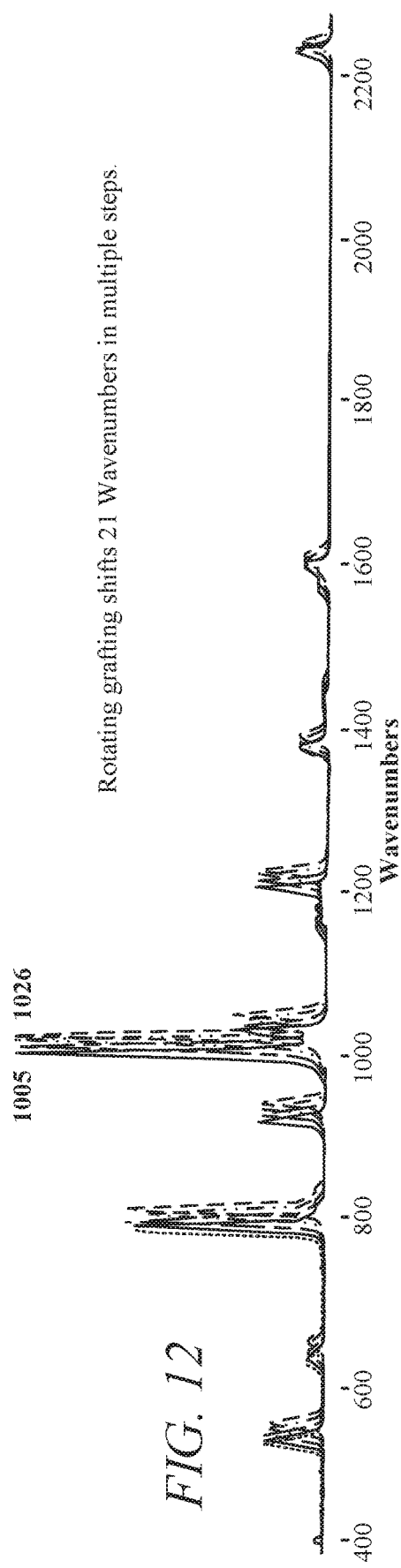
FIG. 12 shows yet another graph of a plurality of individually sensed, shifted spectroscopy signals of a sample.

FIG. 12 shows yet another graph of a plurality of individually sensed, shifted spectroscopy signals of a sample. In this particular example, a rotating grating, shiftable detector and/or other components of a spectrometer optical system provide a plurality of shifts over a range of wavenumbers (e.g., a plurality of shifts over a total range of 21 wavenumbers in multiple steps).

FIGS. 13A through 13B show graphs showing resolution comparison of results obtained from a multiple-excitation wavelength system for an L-Thyroxine sample versus a system comprising a plurality of individually sensed, shifted spectroscopy signals. A computed spectrum from a multi-step rotating grating system is able to resolve the peaks better than a two-step dual laser system. The resolution, in this example, is comparable to that of a 1064 nm Raman spectrometer that is devoid of fluorescence, shown in FIG. 13B.

Figure 14:
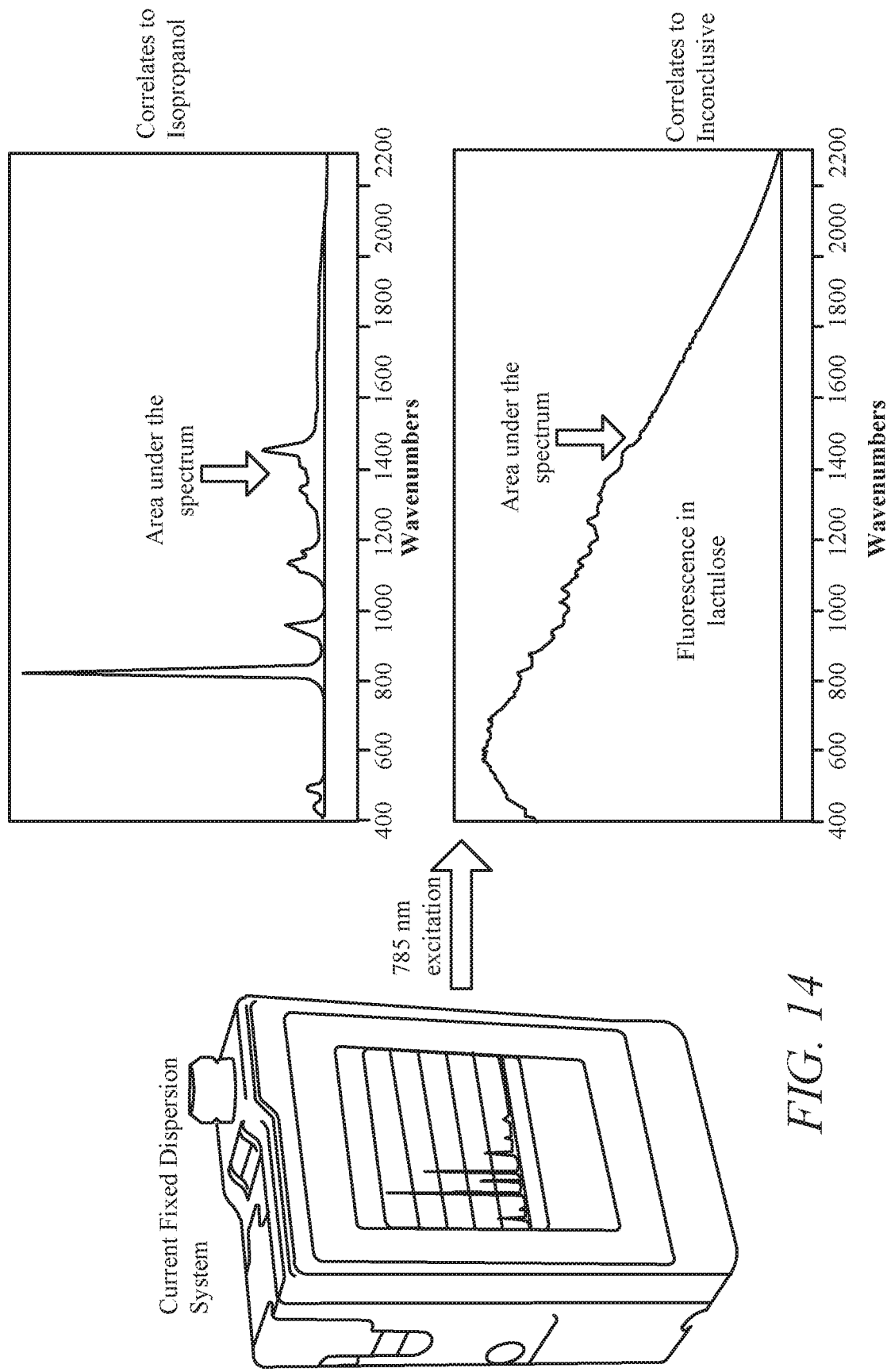
FIG. 14 shows graphs illustrating example problems caused by fluorescence leading to incorrect or inconclusive spectroscopy determinations.
Figure 15:
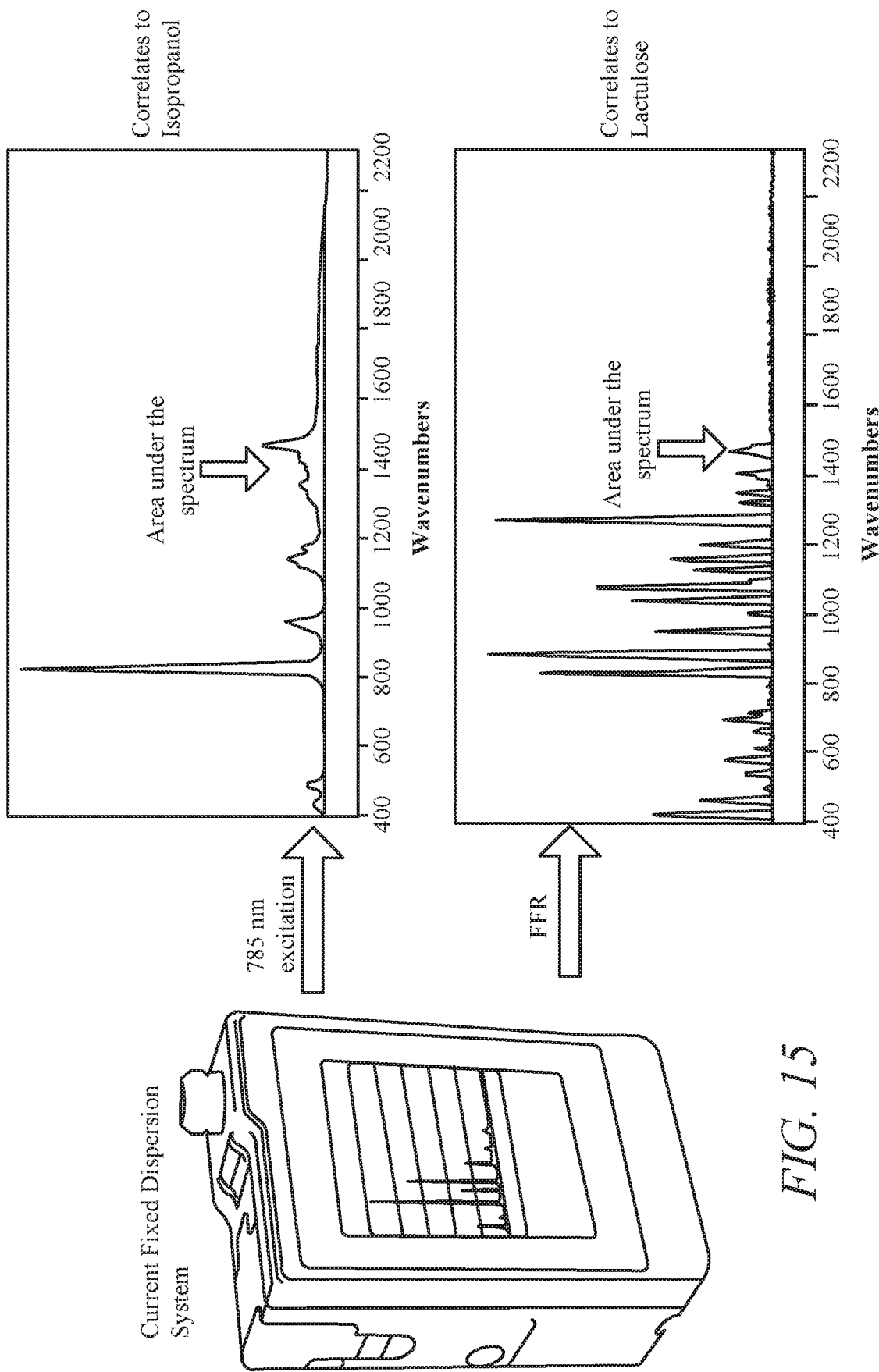
FIG. 15 shows graphs showing examples illustrating the value of fluorescence rejection.

FIG. 14 illustrates an example showing the importance of fluorescence rejection in a Raman spectroscopy application. Identification of materials is typically performed by measure of how well a sample spectrum correlates to a library spectrum. The correlations may be performed by a dot product measurement of the area under a spectral curve. When spectra do not exhibit fluorescence, the dot product is very dependent upon the similarity between the spectra. When the spectra includes fluorescence, however, the area under the spectrum is dominated with a signal that is independent of the Raman scattering. The result is a correlation that is very inaccurate or inconclusive. In FIG. 15, for example, Raman spectra taken for lactulose are interpreted either incorrectly as isopropanol or as inconclusive.

FIG. 15 illustrates the value of fluorescence rejection. In this case, a spectrum of lactulose has been obtained by rotating a grating as described with reference to FIG. 1. A mathematical algorithm described with reference to FIG. 9 was applied to remove the fluorescence. As a result, an accurate correlation to a library spectrum is achieved. FIG. 15 also compares the resulting incorrect match to isopropanol when the spectral shift was not applied.

In various embodiments, by moving a spectroscopy signal relative to a detector of a spectrometer optical system, allows the spectrometer increased flexibility in selecting excitation laser wavelength based on specific applications instead of based on the available distinct laser wavelengths and/tunability of a particular laser. Using multiple lasers, for example, implies that a laser wavelength is easily changed by a small distance in wavelength either with another closely spaced laser or by temperature tuning. That has restricted many systems to 783 and 785 nm and restricts temperature tunable DBR lasers in the 785 nm range. In some applications, it can be advantageous to be able to use a wide variety of available laser wavelengths, such as lasers operating at 532 nm or even 405 nm due to their much higher efficiency. These lasers cannot be jumped to a new wavelength, but spectroscopy signals obtained using these excitation laser wavelengths be shifted as described herein. These wavelengths are also more prone to fluorescence so shifting individually sampled spectroscopy signals obtained using these wavelengths can provide a value for wavelengths such as these. Also, the ability to use a single non-tunable laser can provide significant power savings over driving multiple laser excitation sources or controlling a temperature of and driving a tunable excitation laser source.

Figure 16:
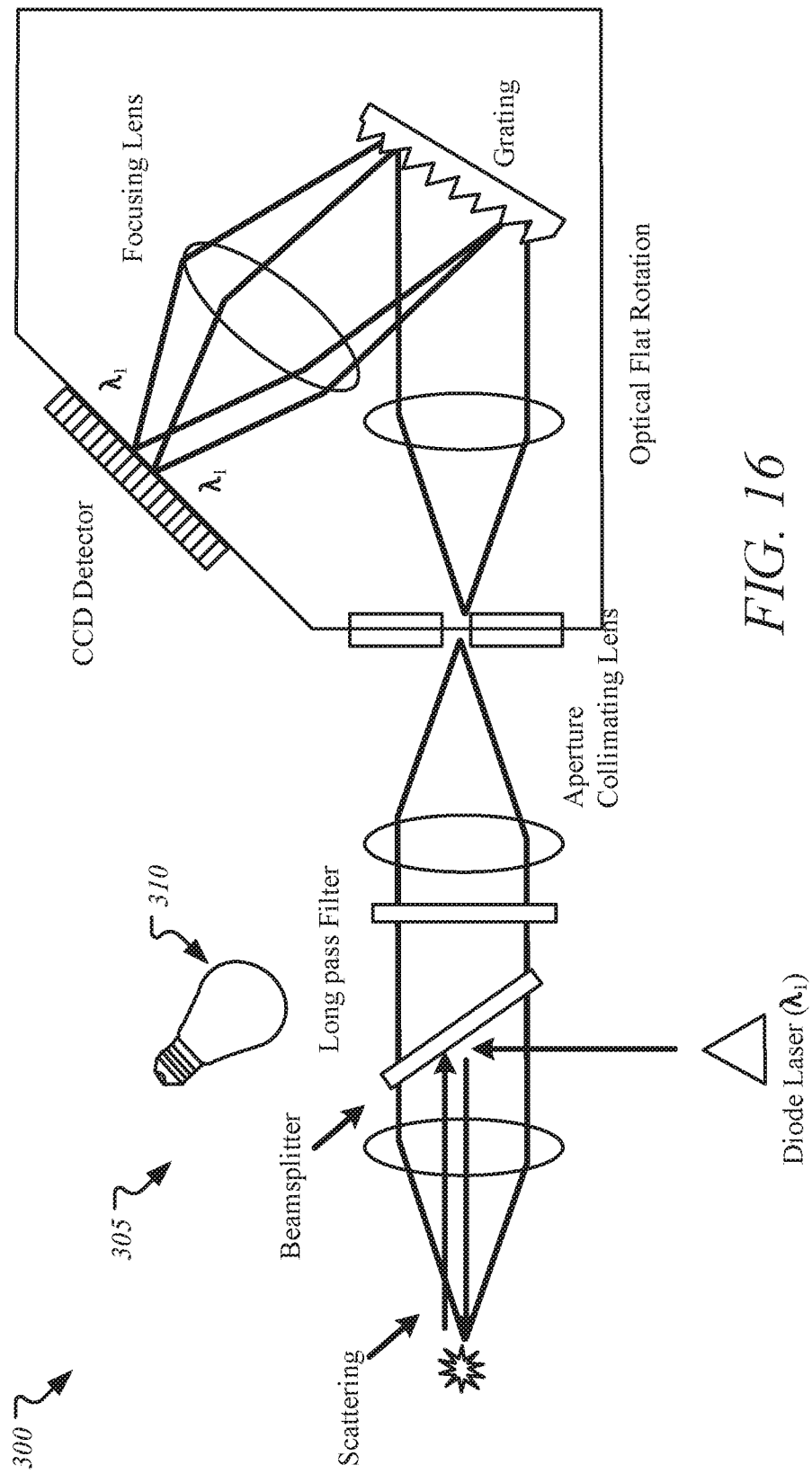
FIG. 16 a schematic diagram of an example embodiment of a spectrometer adapted to provide a method for returning a moveable component of an optical system to a consistent home position.

FIG. 16 is a schematic diagram of an example embodiment of a spectrometer 300 comprising a lamp adapted to provide a method for returning a moveable component of an optical system 305 (e.g., a dispersion element such as a grating, the detector, a filter, an optical flat, micro-electro-mechanical system (MEMS) element, a mirror, or the like) to a consistent home position after a plurality of shifted spectra are acquired. In this embodiment, the spectrometer comprises an optical system 305 that provides an excitation incident signal to a sample, receives a spectroscopy signal from the sample and directs the spectroscopy signal to a detector such as described above with reference to FIG. 1.

Figure 17:
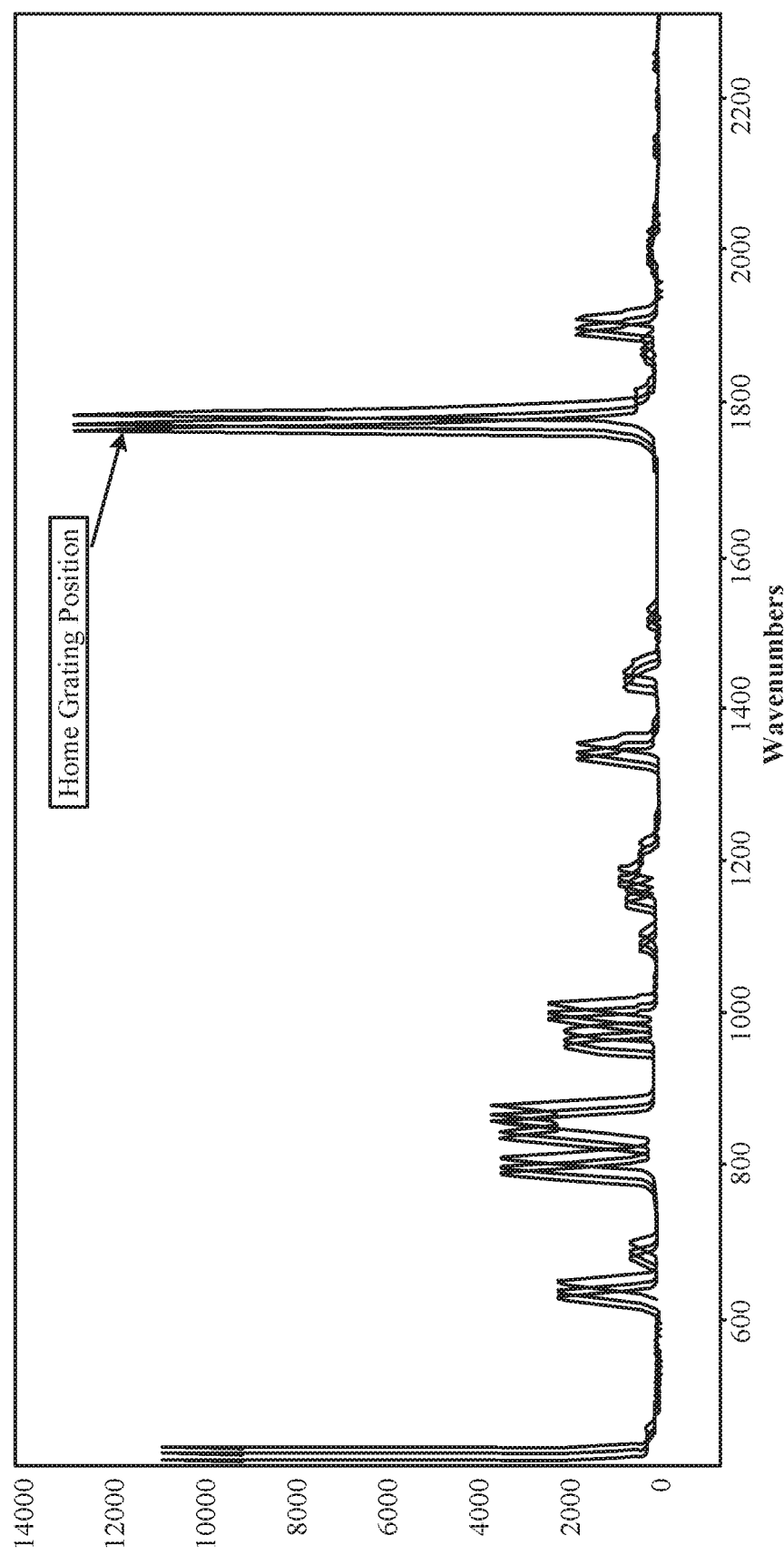
FIG. 17 shows a plurality of spectra for a Neon emission taken at different positions for a movable component of the optical system.

The spectrometer 300 further comprises an emission light source 310 that does not change wavelengths. One example is a low-pressure Neon lamp that emits atomic emission lines across the same wavelength region as a Raman spectrum. As a component (e.g., a grating dispersion element) of the optical system 305 is moved (e.g., rotated or translated), the emission lines (e.g., Neon emission lines) will move the same as the Raman emission lines. This is illustrated in FIG. 17. FIG. 17 shows a plurality of spectra for a Neon emission taken at different positions for a movable component of the optical system, such as a dispersion element (grating), the detector, a filter, an optical flat, micro-electromechanical system (MEMS) element, a mirror, or the like. The positions can be used to calibrate the spectrum at every new grating position. The lines can also be used to ensure the component of the optical system 305 (e.g., a grating dispersion element) returns to its origin or home position. By activating the emission light source 310 and comparing the location of the spectrum to a calibration signal correlated to a home position, the spectrometer 300 can determine if one or more peaks (or other components/features of the signal) is at the correct location on the detector to determine whether the movable component is at its correct home position and ensure that there were no dislocations after the acquisitions. If the spectral component/feature is not in the correct location, the movable component can be moved until the correct location is determined.

Although embodiments have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A Raman spectrometer comprising:
an excitation light source;
a detector adapted to detect a spectrum from a signal;
an optical system configured to direct an excitation signal from the excitation light source toward a sample, receive a spectroscopy signal from the sample, and direct the spectroscopy signal toward the detector,
wherein the optical system comprises a controller adapted to control a movable optical component to iteratively move the spectroscopy signal relative to at least one sensor of the detector and the detector is adapted to detect a plurality of discrete shifted spectroscopy signals each corresponding to a different position of the movable optical component without the use of multiple lasers or a tunable laser adapted to change an excitation signal wavelength for a plurality of the discrete shifted spectroscopy signals, and wherein data from each of the plurality of discrete shifted spectroscopy signals is superimposed to create a vector.

2. The Raman spectrometer of claim 1 wherein the moveable optical component comprises a diffraction grating.

3. The Raman spectrometer of claim 2 wherein the diffraction grating is adapted to rotate the diffraction grating to shift the spectroscopy signal across the detector in a plurality of steps to provide the plurality of discrete shifted spectroscopy signals.

4. The Raman spectrometer of claim 3 wherein the rotatable diffraction grating is configured to shift a dispersed spectroscopic signal across a plurality of sensors of the detector in the plurality of steps.

5. The Raman spectrometer of claim 3 wherein the rotatable diffraction grating is configured to disperse the spectroscopic signal to different relative positions of the detector to provide the plurality of discrete shifted spectroscopy signals.

6. The Raman spectrometer of claim 1 wherein a mathematical decomposed spectroscopy signal is derived from the plurality of detected discrete shifted spectroscopy signals.

7. The Raman spectrometer of claim 6 wherein the mathematical decomposed spectroscopy signal is utilized to reduce noise comprising at least one of fluorescence and background radiation.

8. The Raman spectrometer of claim 7 wherein the noise is reduced without the use of multiple lasers or a tunable laser adapted to change an excitation signal wavelength for a plurality of the discrete shifted spectroscopy signals.

9. The Raman spectrometer of claim 7 wherein the noise is reduced without changing a frequency of the excitation signal.

10. The Raman spectrometer of claim 7 wherein a processor is configured to assemble a matrix from the plurality of individually sensed spectroscopy signals.

11. The Raman spectrometer of claim 10 wherein the processor is configured to use the matrix to decompose the plurality of individually sensed spectroscopy signals to reduce noise.

12. The Raman spectrometer of claim 1 wherein the excitation light source comprises a single laser operating at a generally consistent operating frequency.

13. The Raman spectrometer of claim 1 wherein the moveable optical component comprises the detector.

14. The Raman spectrometer of claim 13 wherein the detector is adapted to translate relative to an optical path of the optical system to shift the spectroscopy signal across the detector in a plurality of steps to provide the plurality of discrete shifted spectroscopy signals.

15. The Raman spectrometer of claim 14 wherein the detector is configured to shift the spectroscopy signal across a plurality of sensors of the detector in the plurality of steps.

16. The Raman spectrometer of claim 1 wherein the moveable optical component comprises at least one of a dispersion element, a diffractive grating, the detector, a filter, an optical flat, a micro-electromechanical system (MEMS) element, and a mirror.

17. A method of obtaining a Raman spectrum from a sample, the method comprising:

directing an excitation signal from an excitation light source toward a sample;

receiving a spectroscopy signal from the sample; and directing the spectroscopy signal toward a detector, wherein the spectroscopy signal is moved relative to at least one sensor of the detector to provide a plurality of discrete shifted spectroscopy signals without the use of multiple lasers or a tunable laser adapted to change an excitation signal wavelength for a plurality of the discrete shifted spectroscopy signals, wherein data from each of the plurality of discrete shifted spectroscopy signals is superimposed to create a vector.

18. The method of claim 17 wherein method comprises superimposing data from each of the plurality of discrete shifted spectroscopy signals to create a vector.

19. The method of claim 18 wherein the method comprises building a mathematical matrix operator and using the mathematical matrix operator to solve a linear problem.

20. The method of claim 19 wherein the method comprises using an iterative method to solve the linear problem that determines a Raman signal comprising a baseline Raman signal.

21. The method of claim 20 wherein the iterative method is further used to solve for an unknown vector of noise.

22. The method of claim 21 wherein the Raman signal is fluorescence free and a baseline Raman spectroscopy signal.

23. A method of determining a Raman spectroscopy signal, the method comprising:

obtaining a plurality of discrete spectra corresponding to a plurality of discrete shifts within an optical system of a Raman spectrometer without the use of multiple lasers or a tunable laser adapted to change an excitation signal wavelength for a plurality of the discrete shifted spectroscopy signals;

superimposing data from each of the plurality of discrete shifted spectroscopy signals to create a vector;

building a mathematical matrix operator; and using the mathematical matrix operator to solve a linear problem.

24. The method of claim 23 wherein the method comprises using an iterative method to solve the linear problem that determines a Raman signal.

* * * * *